US007376553B2

(12) United States Patent
Quinn

(10) Patent No.: US 7,376,553 B2
(45) Date of Patent: May 20, 2008

(54) FRACTAL HARMONIC OVERTONE MAPPING OF SPEECH AND MUSICAL SOUNDS

(76) Inventor: Robert Patel Quinn, 801 Cox Mill Rd., Concord, NC (US) 28027

( * ) Notice: Subject to any disclaimer, the term of this patent is extended or adjusted under 35 U.S.C. 154(b) by 750 days.

(21) Appl. No.: 10/887,121

(22) Filed: Jul. 8, 2004

(65) Prior Publication Data

US 2005/0008179 A1 Jan. 13, 2005

Related U.S. Application Data

(60) Provisional application No. 60/485,546, filed on Jul. 8, 2003.

(51) Int. Cl.
*G10L 19/00* (2006.01)
*G10L 11/00* (2006.01)
*G10L 15/16* (2006.01)

(52) U.S. Cl. .................... 704/200.1; 704/232; 704/236

(58) Field of Classification Search ................ 704/236, 704/200, 200.1, 232
See application file for complete search history.

(56) References Cited

U.S. PATENT DOCUMENTS

| | | | | | |
|---|---|---|---|---|---|
| 5,381,512 | A | * | 1/1995 | Holton et al. | 704/200.1 |
| 5,524,074 | A | | 6/1996 | Massie | |
| 5,768,474 | A | * | 6/1998 | Neti | 704/235 |
| 5,806,024 | A | | 9/1998 | Ozawa | |
| 5,822,721 | A | * | 10/1998 | Johnson et al. | 704/219 |
| 5,832,437 | A | | 11/1998 | Nishiguchi et al. | |
| 5,924,060 | A | | 7/1999 | Brandenburg | |
| 6,003,000 | A | | 12/1999 | Ozzimo et al. | |
| 6,070,140 | A | * | 5/2000 | Tran | 704/275 |
| 6,124,544 | A | | 9/2000 | Alexander et al. | |
| 6,363,338 | B1 | | 3/2002 | Ubale et al. | |
| 6,501,399 | B1 | | 12/2002 | Byrd | |
| 6,571,207 | B1 | | 5/2003 | Kim | |
| 6,584,437 | B2 | | 6/2003 | Heikkinen et al. | |
| 6,667,433 | B1 | | 12/2003 | Qian et al. | |
| 6,678,649 | B2 | | 1/2004 | Manjunath | |
| 6,701,291 | B2 | | 3/2004 | Li et al. | |

(Continued)

OTHER PUBLICATIONS

Teich, Malvin C., "Fractal Character of the Auditory Neural Spike Train," IEEE Transactions on Biomedical Engineering, vol. 36, No. 1, Jan. 1989.*

*Primary Examiner*—Tālivaldis Ivars Šmits
*Assistant Examiner*—Douglas C Godbold
(74) *Attorney, Agent, or Firm*—Adams Intellectual Property Law, P.A.

(57) ABSTRACT

An apparatus for signal processing based on an algorithm for representing harmonics in a fractal lattice. The apparatus includes a plurality of tuned segments, each tuned segment including a transceiver having an intrinsic resonant frequency the amplitude of the resonant frequency capable of being modified by either receiving an external input signal, or by internally generating a response to an applied feedback signal. A plurality of signal processing elements are arranged in an array pattern, the signal processing elements including at least one function selected from the group including buffers for storing information, a feedback device for generating a feedback signal, a controller for controlling an output signal, a connection circuit for connecting the plurality of tuned segments to signal processing elements, and a feedback connection circuit for conveying signals from the plurality of signal processing elements in the array to the tuned segments.

29 Claims, 25 Drawing Sheets

General scheme of fractal harmonic overtone mapping.
(A) Sound input. (B) Multidimensional mapping. (C) Sound output.
(D) Information storage.

U.S. PATENT DOCUMENTS 6,725,108 B1 4/2004 Hall
6,725,190 B1 4/2004 Chazan
6,732,073 B1 5/2004 Kluender et al.
6,741,960 B2 5/2004 Kim et al.
6,745,155 B1 6/2004 Andringa et al.
7,054,811 B2 * 5/2006 Barzilay .................... 704/246
2002/0177995 A1 * 11/2002 Walker ...................... 704/205

* cited by examiner

General scheme of fractal harmonic overtone mapping.
(A) Sound input. (B) Multidimensional mapping. (C) Sound output.
(D) Information storage.

(A) Tonotopic model of cochlea.
(B) Corresponding overtones for basic tones

A

B

| | | | | | | | | | | | |
|---|---|---|---|---|---|---|---|---|---|---|---|
| 12G | Y | A | Z | B | C | P | D | Q | E | F | X |
| 11X | G | Y | A | Z | B | C | P | D | Q | E | F |
| 10E | F | X | G | Y | A | Z | B | C | P | D | Q |
| 9D | Q | E | F | X | G | Y | A | Z | B | C | P |
| 8C | P | D | Q | E | F | X | G | Y | A | Z | B |
| 7Z | B | C | P | D | Q | E | F | X | G | Y | A |
| 6G | Y | A | Z | B | C | P | D | Q | E | F | X |
| 5E | F | X | G | Y | A | Z | B | C | P | D | Q |
| 4C | P | D | Q | E | F | X | G | Y | A | Z | B |
| 3G | Y | A | Z | B | C | P | D | Q | E | F | X |
| 2C | P | D | Q | E | F | X | G | Y | A | Z | B |
| C | P | D | Q | E | F | X | G | Y | A | Z | B |

Fig. 3
Harmonic fields.
(A) Scanning for factor 3.
(B) Factors 2, 3, 5, 7, and 11.
A
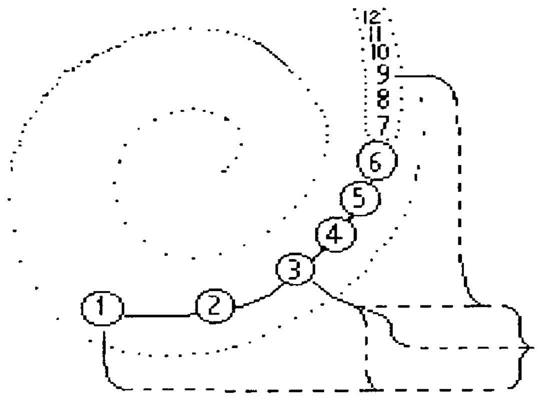
B
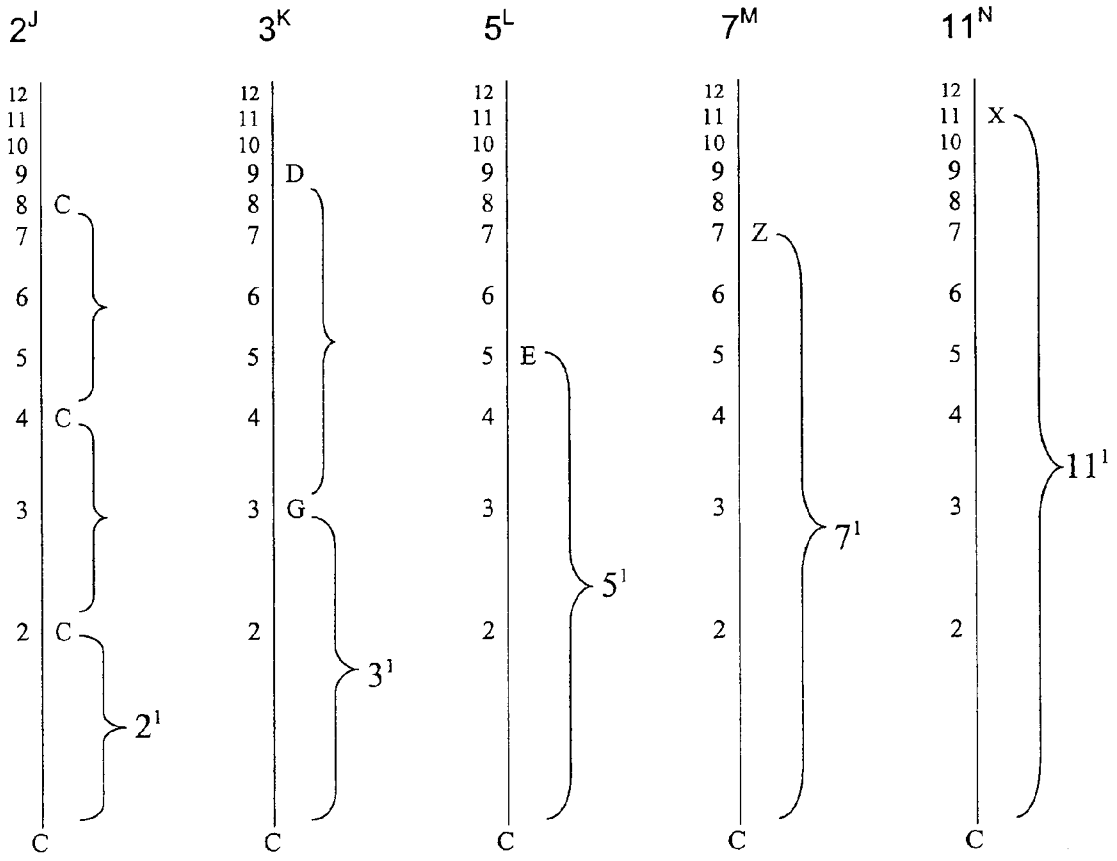

Multidimensional maps. (A) and (B) show one-dimensional and two-dimensional maps. In (C), rather than visualizing maps in front of or behind the page, as in three-dimensional Tic-tac-toe, maps have been displaced laterally. In (D), copies of maps have been displaced vertically.

D

Fig. 5
Musical scales as simplified fractal maps.
Two versions of the bilaaval Ionian - Ancient Lydian (bI-AL), or major, scale are shown. Although the larger *(j, k, l)* map is necessary for "perfect pitch," the smaller *(k,l)* map allows immediate insight into the relationships between notes in the scale.
| | | | | | | |
|---|---|---|---|---|---|---|
| 1 | 9/8 | 5/4 | 4/3 | 3/2 | 5/3 | 15/8 |
| C | D | E | F | G | A | B |
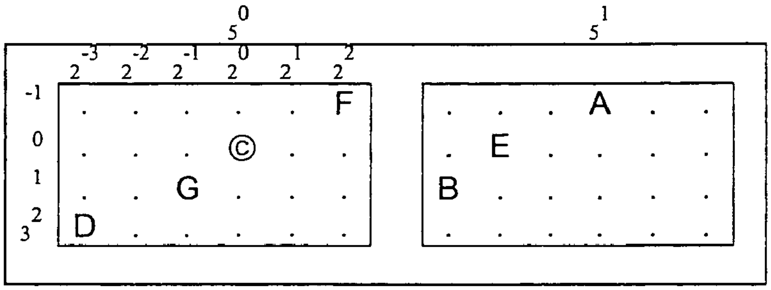
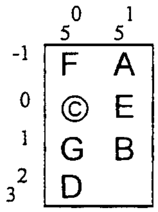

Fig. 6

General pattern of fractal maps

Fractal map of exponents *(k, l)* for powers of 3 and 5.

"Music from A to Z"

| | | $5^{-1}$ | $5^{0}$ | $5^{1}$ | |
|---|---|---|---|---|---|
| | | : | : | : | |
| $3^{-5}$ | ... | A | P | F | ... |
| $3^{-4}$ | ... | E | Y | C | ... |
| $3^{-3}$ | ... | B | Q | G | ... |
| $3^{-2}$ | ... | X | Z | D | ... |
| $3^{-1}$ | ... | P | F | A | ... |
| $3^{0}$ | ... | Y | © | E | ... |
| $3^{1}$ | ... | Q | G | B | ... |
| $3^{2}$ | ... | Z | D | X | ... |
| $3^{3}$ | ... | F | A | P | ... |
| $3^{4}$ | ... | C | E | Y | ... |
| $3^{5}$ | ... | G | B | Q | ... |
| $3^{6}$ | ... | D | X | Z | ... |
| | | : | : | : | |

Fractal map of exponents *(m,n)* for powers of 7 and 11.

Harmonics can be characterized by their pattern of movement from location to location on the fractal landscape. Higher harmonics may provide an alerting sequence, middle harmonics may identify the fundamental, and lower harmonics may be confirmatory.

Comparison of tones that are one "diatonic comma" apart on a fractal map.

Representation of two simultaneous tones, such as formants of speech.
In (A), recognition is aided by low frequency noise ("undertones").
In (B), harmonic overtone mapping confirms the relationship.
Fractal maps show that the processes are complementary.

Vowel formants (from Ladefoged).

The vowel quadrilateral, with resonating tube model of vowels.

Fig. 13 Some data from American English. (Redrawn).

Fig. 14 Formant frequency ranges are broad and overlapping.

Fig.15. F2/F1 ratios define central tendencies and boundaries.

Note vowels [ i ] and [ e ], discussed further in Figs. 16 and 17.

Using fractal map parameters to specify American English vowel [ i ]
as "having F2/F1with an 8:1 or 9:1 ratio; 7:1 is too low, while 10:1 is too high."

"Too narrow" "On target" "On target" "Too wide"

Using fractal map parameters to specify American English vowel [ e ]
as "having F2/F1 with a 4:1 ratio; 3:1 is too low; 9:2 and 5:1 are too high"

Fig. 18
Consonant-vowel coarticulation.
Across a wide range of speech conditions, the ratio of F2-onset to F2-vowel is kept constant. This output may be produced by a trajectory of intermediate steps (circles) guided by fractal mapping. Dashed circle is too low, dark circle is too high.
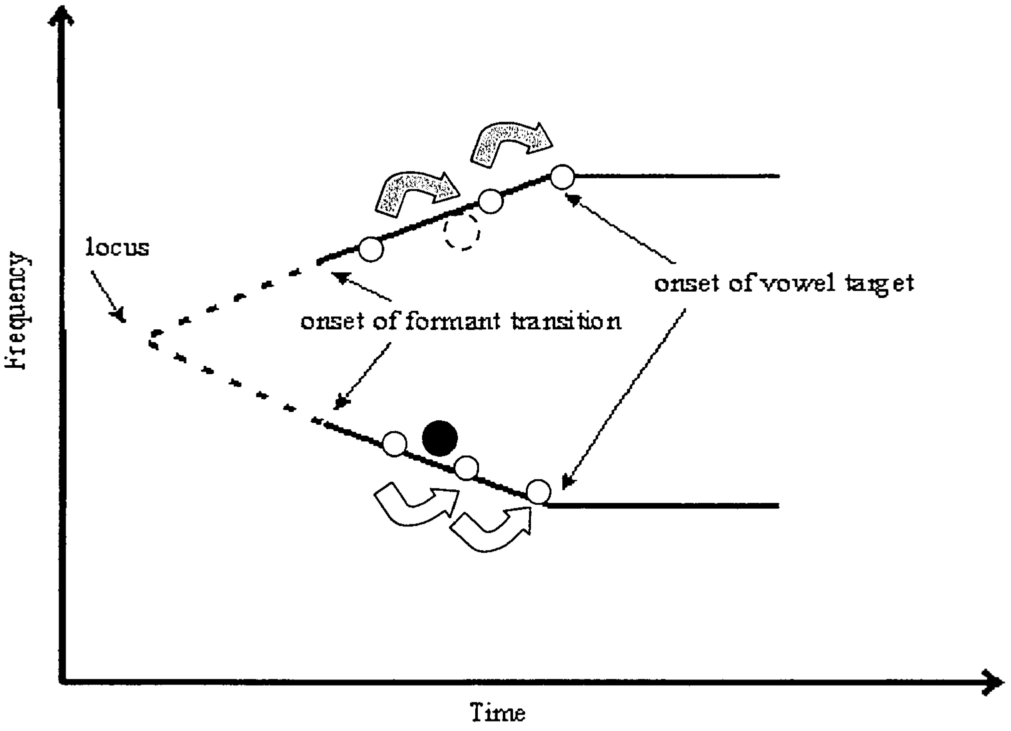
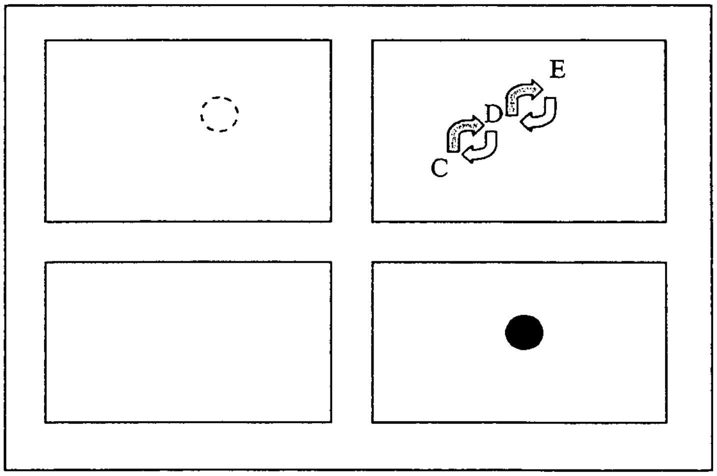

Representation of speech and musical sounds. Process 1 indicates feedback for dynamic control of input sensitivity.

Adaptive acoustics and phonology. Process 2 indicates sound output guided by fractal mapping.

Representation of speech sequences:
words and grammar

Representation of speech sequences:
language information

Fig. 23

Plausible frequencies obtainable from a 4620 Hz signal by simple counting circuits. Counting circuits are of the "one-two-three one-two-three" type. Combinations of counting circuits using the ratios 2:1, 3:1, 5:1, 7:1 and 11:1 can lead to a variety of frequencies, here calculated down to frequencies of about 40 Hz. (4620 Hz was chosen for ease of calculation; numbers in boldface are exact frequencies, in Hertz) The various subharmonics tend to fill only the lower right corner of the fractal map.

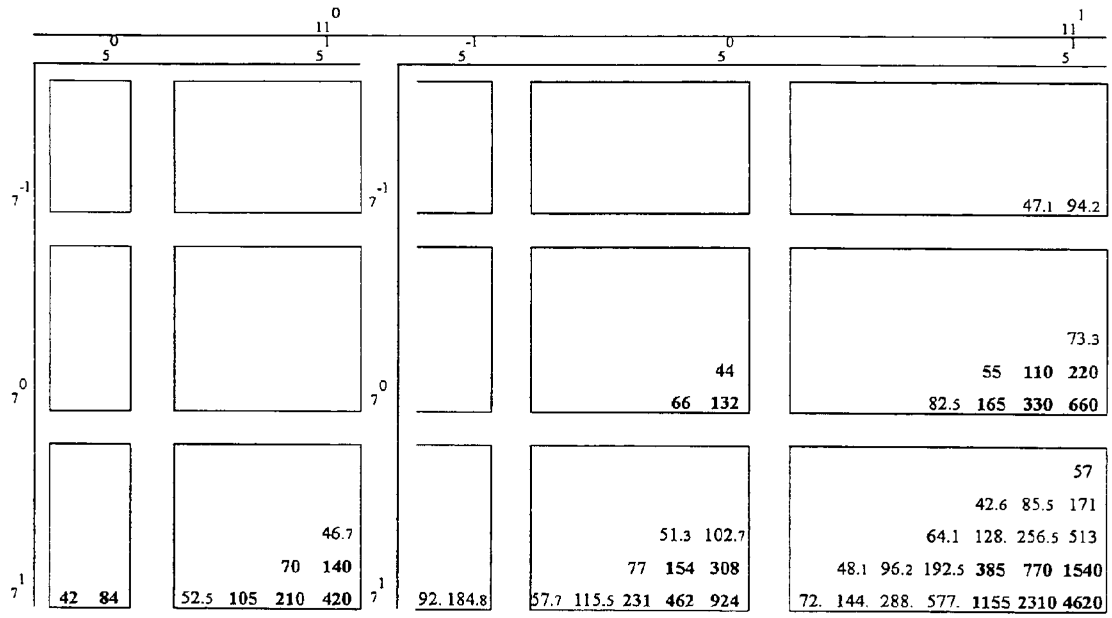

Fig. 24

Inputs from segments that are neighbors in the cochlear model (arrows) can be mapped to widely spaced points on a fractal map. This may result in uneven coverage. Each input is shown with its associated subharmonics. These subharmonics may overlap in various areas in the fashion of overlapping tiles (the lines and dots, representing subharmonics filling a corner of a fractal map like Fig. 23).
Dotted lines illustrate that a portion of a fractal lattice can be chosen so that an area (between the dotted lines) closely resembles a similar area (immediately above one dotted line or immediately below the other dotted line), offset by a constant factor. Specifying the degree of similarity that will be tolerated allows us to define the size of a typical region that mirrors the map as a whole. The fractal map "rolls over" and repeats itself regularly across an extended fractal lattice.

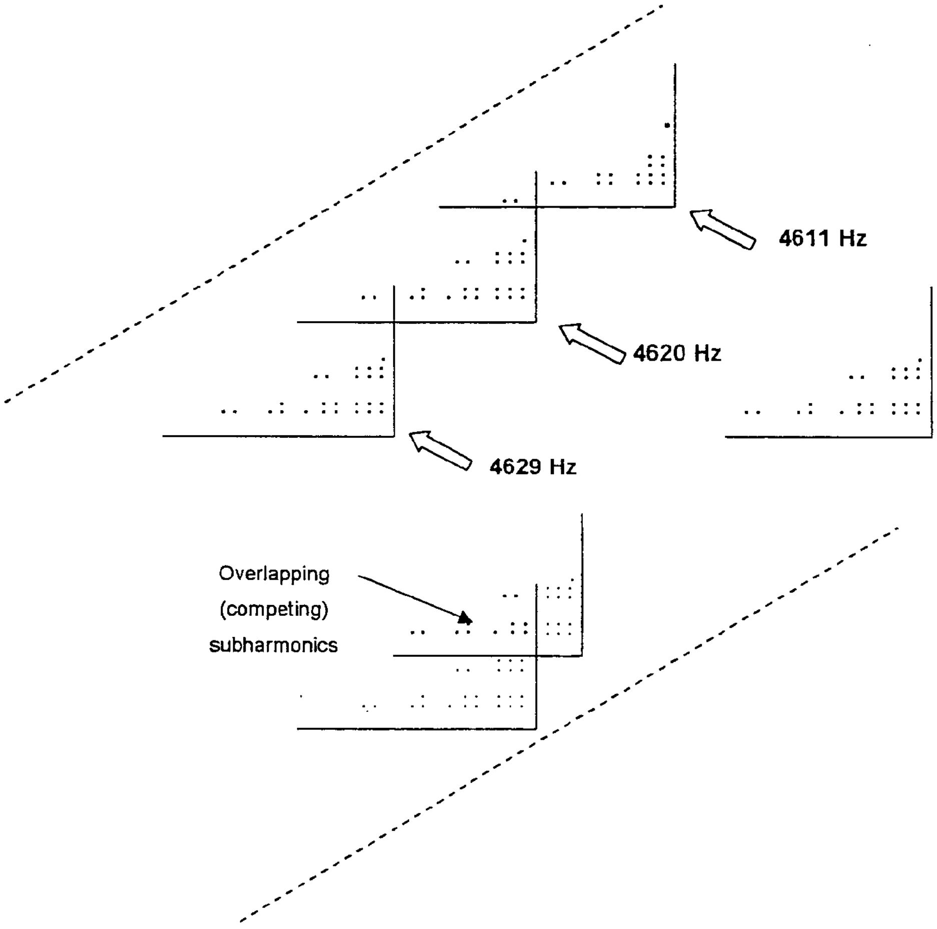

FRACTAL HARMONIC OVERTONE MAPPING OF SPEECH AND MUSICAL SOUNDS

This application is based on and claims priority from provisional application Ser. No. 60/485,546, filed Jul. 8, 2003.

TECHNICAL FIELD AND BACKGROUND OF THE INVENTION

This invention relates to fractal harmonic overtone mapping of speech and musical sounds for high-resolution, dynamic control of input sensitivity, adaptive control of output acoustics and phonology, and for information storage and pattern recognition.

Current strategies for computer speech recognition and voice analysis are generally based on processes that transform information derived from the frequency spectrum of sound. The primary tools in spectral analysis of sound are the Fourier transform and many variants. A large variety of mathematical functions such as inverse spectral ("cepstral") and wavelet analyses have also been applied to speech perception. Current strategies for speech processing reflect the theory that sound is perceived in the inner ear tonotopically, with location along the cochlea correlating with frequency.

A number of prior patents explain the current strategies for signal processing and their limitations. For example, U.S. Pat. No. 6,124,544 teaches that autocorrelation has proven unreliable. One reason that is mentioned is that the sample rate can introduce artifacts.

U.S. Pat. No. 6,701,291 supports advantageously adjusting, in a coordinated manner, a handful of parameters. U.S. Pat. No. 6,584,437 reviews coding methods that use a lattice to encode pitch periods and differences between pitch periods.

U.S. Pat. No. 6,658,383 explains how speech and musical signals are approached differently in the current art. A proposed solution is to encode signals with several modes, using different modes for musical signals and voiced speech signals. U.S. Pat. No. 6,658,383 does not, however, address unvoiced speech.

U.S. Pat. No. 6,725,190 discloses various approaches to coding speech including a proposal for phase-binned speech but requires separate accounting based on a "voicing decision." U.S. Pat. No. 6,745,155 discusses input from a "basilar membrane model device", with time delays or autocorrelation as a means for signal analysis.

U.S. Pat. No. 6,732,073 discloses a way of enhancing a frequency spectrum, using the history of sound signals a short interval before as well as information about sound signals a short interval afterward. The inclusion of information over time is a key aspect of many current approaches to signal analysis.

Cochlea, the Latin word for "chamber," is pronounced either as "coke"-lee-uh or as in the phrase "the cockles of the heart" (from the Latin cochleae cordis, "chambers of the heart"). Like the heart, it has a spiral shape (a "cockleshell"), which acts somewhat like a prism to separate sound into its various component frequencies. Frequency information is processed in the inner ear, which consists of the cochlea, the cochlear nucleus, and a variety of brain centers. There are three problems with a psychoacoustic model that uses only tonotopic frequency information.

Critical bands, which limit our ability to hear frequencies that are too close together, indicate that there is a signal processing mechanism along the length of the cochlea that may provide contrast enhancement or automatic gain control. Experiments show that for typical tones, the fundamental and harmonic overtones 2 through 6 are perceived as distinct tones and higher harmonics are perceived as a fused "residue tone" or "residual tone." Humans apparently can only be consciously aware of harmonic overtones that are far enough apart to fall into separate critical bands. Humans cannot hear harmonic overtones that are "too close together." However, this does not preclude possible mechanisms that advantageously make use of information in higher harmonic overtones via unconscious processes. Signal processing via such "hidden Markov models" is a common theme in neural network modeling.

"Active hearing" refers to recent advances in our understanding of the mechanism of hearing including the function of the protein prestin and the presence of a spectrum of self-reinforcing vibrations in the inner ear. These reverberations are due to positive feedback loops across the width of the cochlea involving outer hair cells and their stereocilia. Stereocilia act as valves that control the flow of charged ions (like transistors, controlling the flow of more power than they absorb, according to C. D. Geisler, From Sound to Synapse, Oxford Univ Press, 1998). When movement of an outer hair cell's stereocilia change its voltage, the protein prestin causes the cell to elongate or contract. (D. Oliver et al., Science 292, 2340, 2001). This rocks the cochlear partition, which triggers the cell's stereocilia, causing the cycle to repeat. In effect, each segment of the cochlea is a regenerative receiver. This is the historical term used for radio receivers that used positive feedback. They invariably had a regeneration control to vary the amount of positive feedback (Philip Hoff, Consumer Electronics for Engineers, Cambridge Univ Press, 1998).

According to active hearing, when a sound is initially perceived there may be a gesture-like shift in the reverberations in the cochlea. Hearing a sound may force the cochlea to "tune in." This type of process would be analogous to "adaptive optics" and would require dynamic feedback with a time scale estimated to be on the order of 0.5 ms. Thus, the function of the cochlea is more than a prism-like separation of sound into its component frequencies.

Multiple maps of auditory space have been suggested by experiments involving researchers wearing distorting earpieces that disrupt their ability to judge whether sounds are "up" or "down." (P. M. Hofman, J. G. A. Van Riswick, A. J. Van Opstal, Nature Neuroscience, 1 (5)417,1998). Unlike experiments with distorting eyeglasses, which take time for readjustment afterwards, correct sound localization occurred immediately when the fake ears were removed. Thus, shifting between cortical representations is possible, raising the question of how frequency information distributed along the cochlea (a one-dimensional analog) could be sufficient to model the three-dimensional world. An additional problem is how the complexity of multiple maps would be managed.

Two innovationssolutions were developed by the author. The first is from the field of neural network signal processing and is the concept "harmonic fields." The second is from the field of optimization theory and is an extension of the mathematical concept of an adaptive walk on a virtual landscape, "fractal mapping." If the virtual landscape is a map of the neuromuscular patterns for sound in the throat and also the sensorineural patterns for sound in the ear, combined with the neural feedback for dynamic control of active hearing in the cochlea, optimization of the multiple interacting streams of data applying to different size scales but have similar recursive possibilities could occur. The result would be similarity and function across different size scales, leading the author to the concept "a fractal map of harmonic overtone space."

The invention was developed in the course of research for the paper, "Fractal harmonic reconstruction of ancient South Asian musical scales," by Robert Patel Quinn, M. D. The invention is introduced as a method for analyzing harmonic overtones, which are high pitch sounds that have frequencies which are an exact multiple of the fundamental frequency. Although a frequency can be described both as a harmonic and as an overtone, the terminology employed in the paper distinguishes harmonics from overtones by using numbers for harmonics and letters for overtones, and uses the convention that harmonic 1 is the fundamental frequency of a tone. Musical notes are drawn as a column (a musical staff) with higher pitch harmonic overtones at the top and the fundamental at the bottom.

In contrast to neural network signal processing models of the sense of touch and vision, which involve "receptive fields" that are spatially contiguous, the olfactory system processes smells by "molecular receptive range." (K. Mori, Y. Yoshihara, Progress in Neurobiology, Vol 45, 585, 1995). An analogous process in the ear could correlate sounds an octave apart, leading to harmonic fields.

Harmonic fields can be visualized (FIG. 3) as a connection (a neuron) linking two points in the cochlea; for example, those that correspond to harmonics 9 and 3. Another example of a harmonic field is shown by the neuron linking harmonics 3 and 1. Each neuron would also function as a "sensor" for coinciding harmonics 6 and 2 of other tones with different fundamentals, reinforcing the linking relationship; the harmonic fields are detectors of the ratio rather than of specific numbers. Higher order connections between these neurons ("neural networking") and signals flowing toward the brain as well as "active hearing" signals flowing toward the cochlea are important components of the fractal harmonic overtone mapping model. The hypothesized harmonic fields are scanned and the results are integrated into a multi-dimensional map. The illustration shows that sound first enters the inner ear at the high-frequency end of the cochlea. Depending on the speed of sound in the fluid of the cochlea and the speed and course of neural signals, this may be a reason that harmonics are scanned from high to low frequencies, although the spiral design of the cochlea tends to ensure that harmonics are perceived roughly simultaneously.

A more fundamental reason why high frequency harmonics would be expected to be perceived first is the fact that the higher sampling rates possible at high frequencies would allow the wavelength of sound to be identified faster.

"Inharmonic fields" would not be expected to develop. Unevenly spaced "inharmonic fields" would not be expected to develop naturally in the nervous system since reinforcement would not occur from inputs with a variety of fundamental frequencies if their harmonics were not appropriately spaced.

If designed according to a genetic algorithm approach, efficiency suggests that some harmonic fields are redundant. An evolutionary approach would tend to produce enough complexity to exploit information but not too much for processing. The paper proposes the assumption that "harmonic fields develop only for tones that provide new information (the prime factors 2, 3, 5, 7, and 11)." This is because scanning through these prime number ratio harmonic fields (looking for simultaneous or near-simultaneous sounds) and then using other neurons to scan for simultaneous or near-simultaneous "higher order" correlations of neural network signals would result in information that can be recorded in a consistent fashion on a five dimensional fractal map. Information associated with ratios such as 4, 6, 8, 9, 10 or 12 would be included in the map, offset by an appropriate magnitude. It would be redundant to require separate dimensions to represent the same information. Prime-numbered fields would carry new information.

The information from harmonic fields would constitute parallel channels (streams) of information. Parallel processing would allow hidden Markov models to solve the problems of phonology and segmenting the stream of speech. This is currently the major roadblock to current strategies for computer speech recognition and voice analysis which do not perform signal processing in terms of categorical features.

The method section of the author's paper, "Fractal harmonic reconstruction of ancient South Asian musical scales," opens with, "The basic idea of a fractal is that the same processes, or the same statistics or properties of a figure, are found at all size levels. In a fractal representation of multidimensional space each feature of the fractal represents a different axis and the range of values (magnitude) of each feature is plotted along that axis. Familiarity with the relationship between points on one or two axes gives familiarity with the relationships between points on all axes" (See to "B. Levitan; santafe.edu\nk.html.") "We can map out a rectangular array using the first two factors, then for the next factor we add another array displaced horizontally, followed by a copy of the arrays displaced vertically. By alternating these steps as we add successive factors, we develop the recursive property that gives the representation its fractal nature." These steps establish that a multidimensional map can be graphically represented in two dimensions. It should be noted that the cited online article by Bennett Levitan was an explanation of how he and Simon Pariser could graphically display various nucleic acid base pairs and the way they mutated to become codons for other amino acids. Although this is in a different field, the pattern of iterative steps (first left to right, then top to bottom, then left to right, etc.) was followed in constructing the fractal harmonic overtone map in order to establish a consistent convention.

SUMMARY OF THE INVENTION

Therefore, it is an object of the invention to provide a fractal representation of harmonic fields and fractal harmonic overtone mapping for high-resolution, dynamic control of input sensitivity.

It is another object of the invention to provide a fractal representation of harmonic fields and fractal harmonic overtone mapping for adaptive control of output acoustics and phonology.

It is another object of the invention to provide a fractal representation of harmonic fields and fractal harmonic overtone mapping for information storage and pattern recognition for speech and music.

These and other objects of the present invention are achieved in the preferred embodiments disclosed below by providing an apparatus for signal processing based on an algorithm for representing harmonics in a fractal lattice, the apparatus comprising a plurality of tuned segments, each tuned segment including a transceiver having an intrinsic resonant frequency the amplitude of the resonant frequency capable of being modified by either receiving an external input signal, or by internally generating a response to an applied feedback signal. A plurality of signal processing elements arranged in an array pattern. The signal processing elements include at least one function selected from the group consisting of buffer means for storing information, feedback means for generating a feedback signal, controller means for controlling an output signal, connection means for connecting the plurality of tuned segments to signal processing elements, and feedback connection means for conveying signals from the plurality of signal processing elements in the array to the tuned segments.

According to one preferred embodiment of the invention, the tuned segments form a combined sensor unit arranged in a cochlea-like pattern.

According to another preferred embodiment of the invention, individual ones of the signal processing elements include a neural-column structure having a plurality of layers, at least some of which layers are capable of functioning as counting circuits, selected from the group of counting circuits selected from the group of 2:1 counters, 3:1 counters, 5:1 counters, 7:1 counters, and 11:1 counters.

According to yet another preferred embodiment of the invention, the plurality of signal processing elements are arranged so that an output from the counting circuits can be directed to counting circuits in other signal processing elements in order to generate a plurality of signals at subharmonic frequencies, each subharmonic frequency being associated with a separate signal processing element.

According to yet another preferred embodiment of the invention, the fractal lattice includes guide means for guiding an organizational pattern for local sections of the array by performing at least one of the processes in a group of process steps consisting of establishing sensory and feedback connections between the signal processing element for a given frequency and the tuned segment having approximately the same characteristic frequency, generating a plurality of subharmonic signals that fall within the relevant frequency range of the tuned segments, and tentatively connecting these signal processing elements to the appropriate tuned segments, selecting unassigned tuned segments and tentatively connecting them to available signal processing elements at dispersed points in the array, approximately matching the intrinsic frequency of each tuned segment with signal processing elements that can create a rhythm generator for another local area of subharmonic frequencies, maintaining areas of overlapping subharmonics if their interacting counting circuits can be shared and are consistent, and removing the tentative connections if they are inconsistent, removing the tentative connections from elements in the array if their feedback goes to neighboring tuning segments that are too close together, so that similarly tuned neighboring segments become associated with signal processing elements that are widely spaced, and continuing until signal processing elements are connected to a sufficient number of tuning segments and a sufficient number of subharmonic generators have been organized to cover the array.

According to yet another preferred embodiment of the invention, the optimal number of the tuned segments and the signal processing elements are determined by the degree of fine-grainedness and speed of acquisition of the input signal.

According to yet another preferred embodiment of the invention, the optimal number of tuned segments and signal processing elements are determined by the degree of fine-grainedness and speed of the feedback response.

According to yet another preferred embodiment of the invention, the number of dimensions in the fractal lattice and range of values in each dimension are determined by transceiver characteristics selected from the group consisting of sensitivity of input, specificity of input and feedback signals of the individual tuned segments.

According to yet another preferred embodiment of the invention, the number of dimensions in the fractal lattice and range of values in each dimension are of a predetermined computational complexity.

According to yet another preferred embodiment of the invention, the number of dimensions in the fractal lattice and range of values in each dimension are determined by processing speed.

According to yet another preferred embodiment of the invention, the apparatus including means for selectively transmitting a plurality of feedback signals to adjacent tuned segments which would otherwise be subject to alternating constructive and destructive interference, wherein the feedback signals are selected from neighboring signal processing elements for minimizing interference beating.

According to yet another preferred embodiment of the invention, the invention includes harmonic derivation means for deriving harmonically related signals of similar phase from subharmonic generators and using the related signals to add energy to various tuned segments by subthreshold strobing at the characteristic frequency of such segments.

According to yet another preferred embodiment of the invention, the invention includes signal selection means for selecting signals of non-adjacent segments from signal processors elements to allow signals with different phases to be reinforced by differently-phased strobing feedback signals.

According to yet another preferred embodiment of the invention, a method of signal processing based on an algorithm for distributed representation of signals, and of the harmonic relations between components of such signals, represented by a fractal lattice which includes multiple dimensions based on harmonic fields is provided, the method comprising the steps of mapping input signals to signal processing elements arranged in an array, processing signals to generate a plurality of feedback signals at subharmonic frequencies, combining the plurality of feedback signals with subsequent input signals.

According to yet another preferred embodiment of the invention, the algorithm comprises EQ#R=2.sup.j*3.sup.k*5.sup.L*7.sup.m*11.sup.n.

According to yet another preferred embodiment of the invention, the method includes the further step of providing additional harmonic information in an expanded fractal lattice reflecting a dimension selected from the group consisting of 13, 17, 19, and 23.

According to yet another preferred embodiment of the invention, the method includes the step of simplifying the algorithm by removing one or more factors in order to allow a fractal lattice of a recorded dimension.

According to yet another preferred embodiment of the invention, the method includes the step of modelling an input signal as a spectral representation selected from the group consisting of a discrete Fourier transform and a logarithmic frequency spectrum.

According to yet another preferred embodiment of the invention, the method includes the step of deriving the input signal from speech sounds.

According to yet another preferred embodiment of the invention, the method includes the step of deriving the input signal from the group consisting of musical sounds, a mixture of speech and music, and a mixture of audio signals other than speech, music or a mixture of speech and music.

According to yet another preferred embodiment of the invention, the method includes the step of deriving the input signal from signals of unknown origin.

According to yet another preferred embodiment of the invention, a computer readable medium is provided having instructions for performing steps according to the method.

BRIEF DESCRIPTION OF THE DRAWINGS

Some of the objects of the invention have been set forth above. Other objects and advantages of the invention will appear as the invention proceeds when taken in conjunction with the following drawings, in which:

FIG. 3 shows harmonic fields in the cochlea, and demonstrates the harmonic fields that correspond to factors 2, 3, 5, 7, and 11;

FIG. 5 shows a 3-dimensional fractal map, simplified to illustrate a musical scale with two dimensions (a "diatonic scale");

FIG. 6 shows a general pattern of fractal mapping of harmonic overtone space;

FIG. 18 shows how the uniform output of consonant-vowel coarticulation can be explained by movement patterns on the fractal landscape without invoking hypothetical "loci" for consonants;

FIG. 23 shows plausible frequencies obtainable from a 4620 Hz signal by simple counting circuits;

FIG. 24 shows inputs from segments that are neighbors in the cochlear model (arrows) can be mapped to widely spaced points on a fractal map.

DESCRIPTION OF THE PREFERRED EMBODIMENT AND BEST MODE

Referring now specifically to the drawings, a system for fractal harmonic overtone mapping according to the present invention is illustrated in the Figures.

Figure 1:
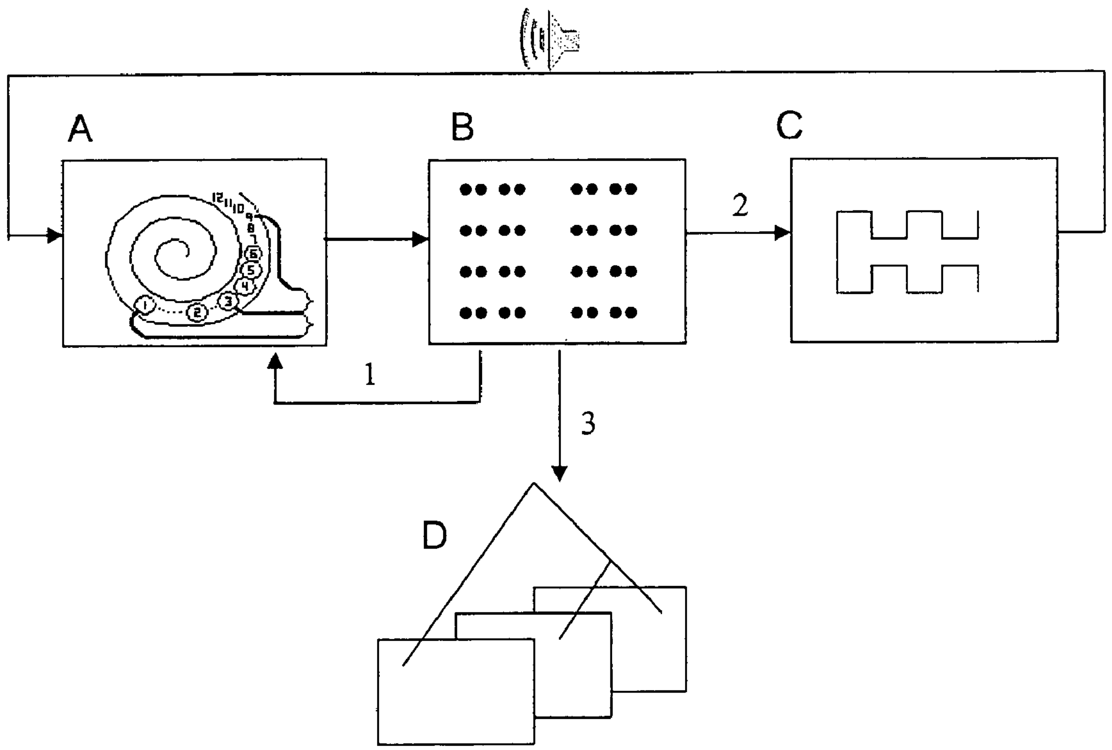
FIG. 1 shows the general outline of the four essential elements of fractal harmonic overtone mapping and the feedback loops from which its properties emerge.

Fractal harmonic overtone mapping has four essential elements, labeled A through D in FIG. 1. Fractal mapping manifests three types of signal processing illustrated by feedback analysis of FIG. 1.

Sound input (Block A) is analyzed via harmonic fields of different sizes, with parallel processing of the information from numerous staggered fields. Harmonic field correlational data from Block A are accumulated in Block B, where multidimensional mapping takes place. The simple feedback loop from Block B to Block A ("Process 1" signal processing) provides dynamic control of input sensitivity, via harmonic fields of different sizes.

Signals from Block B to Block C control sound output ("Process 2" signal processing). Feedback from Block C can be transmitted as an auditory signal to Block A which is then mapped to Block B, resulting in a two-step feedback loop that can provide adaptive acoustics for music and phonology for speech.

Features from Block B over a period of time are stored sequentially in Block D ("Process 3" signal processing), resulting in recognizable patterns that may be analyzed categorically as words, grammar, and language information. Feedback from Block D can be directly applied by adjusting the properties of the map in Block B, using map-based rules to affect the other feedback loops that go through Block B, allowing for the possibility of dynamical systems behavior in which small differences in initial conditions may result in vastly different states. It is also possible for feedback from Block D to be applied to associated Block A or Block C processes, but directing feedback to the fractal harmonic overtone map would be more parsimonious, as it may encourage dynamical systems behavior such as chaotic "attractors" that allow novel but unstable patterns to develop.

In addition to the four essential elements A, B, C, D from FIG. 1, a fifth essential element (a quintessential element) would be the mapping formula. Although more than five dimensions can be used for other purposes (see part 5), the paper's analysis of critical bands in human hearing, historical evidence from ancient music, and arguments from human evolution suggest that five dimensions are sufficient for speech and music. Assigning a point (j, k, l, m, n) to represent a "just intonation" exact ratio tone R according to the formula $$R=2^j3^k5^l7^m11^n$$

allows resonant signals to be analyzed and graphed multidimensionally over a "quantal" landscape of discrete, perfectly spaced points in an array. This mathematical array would be easily accommodated in electronic or other digital form. This formula can be used statically, to store speech data or to define precise points in representations of various musical scales, and also can be used dynamically, allowing us to encode speech and music features as a channel or data stream. However, in order to avoid confusion between notes with similar names but in different octaves, the descriptions and examples in this application are confined to a single octave with ratios in the interval from 1 to 2, in which we can map tones in four dimensions as points (k, l, m, n).

Included in the scope of the invention are:

1. Any and every product embodiment of fractal harmonic overtone mapping, including virtual maps of harmonic fields;

2. Maps of frequency ratios, or maps of mathematical functions that duplicate the input, output, or content of such a map;

3. Maps of overtones arrangement that are indexed in two or more dimensions; map of harmonic overtone space, 4. Maps that encode correlations of frequency input and organizes output;

5. Analyzing sounds by scanning harmonics based on a fractal map;

6. Analyzing sounds as locations and movements on a fractal map;

7. A process for representing sounds in five dimensions and an algorithm for filtering and recognizing speech and musical features;

8. Any device with high resolution feedback due to selective amplification of certain harmonics;any device that exhibits adaptive behavior by spectrum analysis using precisely spaced co-incidence detectors;

9. Any genetic algorithm for speech or music that derives a multidimensional harmonic map;

10. Any algorithm for dynamical system behavior that uses sound input feedback and sound output feedback based on a common map;

11. Any high-resolution feedback other than simple analog feedback, especially if guided by any type of frequency ratios an array or any type of parallel processing involving ratios of fractal map feedback or filtering, of any type.

12. Any type of correlated feature output including parallel processing; and

13. Any process giving the ability to resolve different formants of the vocal tract due to fractal mapping.

A preferred embodiment of fractal harmonic overtone mapping according to the invention would includes spectral representations with logarithmic frequency axis, such as a spectral envelope derived from a discrete Fourier transform, or created in an analog fashion.

Provisions that reflect basic properties of signals, such as intensity, duration, pitch and timing of signals, are handled by encoding these parameters on the fractal maps, using wherever possible simple global parameters that are more resistant to high noise levels. In particular, increased amplitude of signal, or loudness, is preferably quantified or characterized by the number of areas affected.

Parameters that encode essential aspects of attack, decay, sustain, and release are also an important aspect of fractal mapping. This is embodied by reducing the temporal evolution of a signal to a sequence of essential images that can be reconstructed from minimal data.

Using a map as a representation for signals such as auditory signals as patterns of images including moving images or scaled images on a map that preserves self-similarity permits using the map as a timing standard. This allows the creation of auditory images in sequence that can represent a transient signal image.

Another preferred embodiment is to use fractal mapping for a human-like in the range of sounds, including dichotic and diotic signals, and include phase information (generally available until the volley rate tops out at about 5000 Hz and above).

Another preferred embodiment is to use an input signal is modeled a spectral representation such as a discrete Fourier transform or a logarithmic frequency spectrum.

Another preferred embodiment is to use an input signal derived from speech sounds.

Another preferred embodiment is to use an input signal derived from musical sounds, or a mixture of speech and music, or a mixture of other audio signals.

Another preferred embodiment is to usan e input signal derived from signals of unknown origin.

The invention exploits the gesture-like nature of adaptive feedback, allowing speech and music to be "subconsciously" analyzed by strategies such as hidden Markov models (HMM) and allowing models to analyze phonemes and resonances. By extension, this mapping is also a way of indexing words and of organizing grammatical rules and musical constructions. The way acoustic space is partitioned for a particular person would be a consistent, self-organizing map of multidimensional features, allowing more accurate voice prints and voice recognition.

For example, vowels are recognized by their formants, i.e., a resonance of the vocal tract. Across wide range of languages, vowels vary but properties such as the ratio F1/F2 (the ratio between first and second formant frequency) and the F2 onset-F2 vowel ratios (the ratio between initial and plateau second formant frequency) generally fall into a consistent range. The articulatory system across diverse articulations adjusts consonant-vowel coarticulation to preserve feature of the output. Vowel formants vary tremendously but the ratio between formants suggests that certain features (ratios) act as boundaries or may act as central tendencies. This would allow similar sounds to be interpreted in different ways depending on different languages.

The length of time it takes for a speech segment to plateau, probably to allow for processing time, may be language dependent, so different parameters may be needed for onset and decay of input elements over time. Similarly, time domain parameters would vary depending on the adjustments needed for acoustic output.

Output of the fractal map is like a digital processor, not being based on the frequency spectrum, an analog of sound. Method would allow subconscious signal processing strategies to work like through hidden Markov models to further study psychoacoustics and more closely reproduce human speech. Speech features analyzed with categorical perception are interpreted differently than sinusoidal sound waves. This allows the process of adaptive feature extraction.

A method according to the invention would allow music to be analyzed and modified and would provide a new compact coding scheme for audio information and a novel storage method for speech information. Since good quality music and speech require fractals, distortions would result from any modification.

Another aspect of this invention is that it creates a dramatically improved model of the motor theory of speech perception by allowing the association of the gesture-like character of dynamic feedback with the motor output of speech. Reflexes that adjust hearing sensitivity take a certain finite time span to react, so that speech segments tend to "plateau" for the length of time that it takes for this to occur.

In the same way, the motor patterns involved in speech take a certain time span to react, so the speaker tends to slow down to a pace that can be both heard and attended to with dynamic feedback, a feature that computer generated speech could find useful.

Other applications would allow reframing of virtually all speech and musical parameters, allowing characterization of different resonances of the vocal tract, resulting in more accurate voice prints.

More accurate neuromuscular models of speech would have many applications, from diagnostic (speech pathology) applications to computer speech production to computer speech reception.

Other applications are possible, such as scanning harmonic fields, capturing transients, adding time delays, "windows of attention" while speech segments plateau and adding "gates" to reject signals below a certain threshold in specific focal areas. Fractal harmonic overtone mapping allows filtering to get rid of high pitch and low pitch noise by only allowing harmonic spectra.

Other applications include adding back in the lowest formant into telephone audio, cancelling noise and adding back the correct formants, and providing a hearing aid that filters out nonspeech sounds to allow background noise suppression.

Dynamic control could be extremely fast, enhancing some input while suppressing other input, for example, preventing toxic noise exposure.

Another application is that of an electronic cochlea (in silico).

Adaptive tuning may be provided that measures speed via the Doppler effect based on fractal harmonic overtone mapping. A five dimensional fractal Quintic scale based on 2, 3, 5, 7, 11 may be designed to train the ear and brain to respond to inputs like 11/7, 7/5 and 5/3. This scale would be based on the frequency ratio 35/33 between the twelve basic notes of a an octave, resulting in an octave that is slightly stretched.

Figure 2:
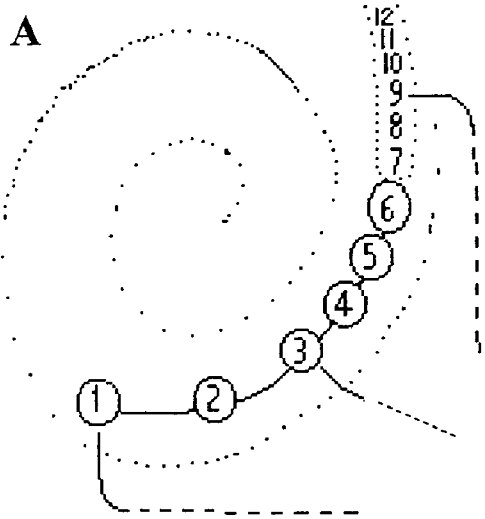
FIG. 2 shows the tonotopic orientation of the cochlea, and the harmonic overtones for the notes of the 12-division octave eliminating names with sharps and flats, using the notation for the white keys CDEFGAB and the black keys PQ XYZ of the piano keyboard (using the mnemonic "PDQ") with the equivalences P=C#/Db, Q=D#/Eb, X=F#/Gb, Y=G#/Ab, Z=A#/Bb.
Figure 4:
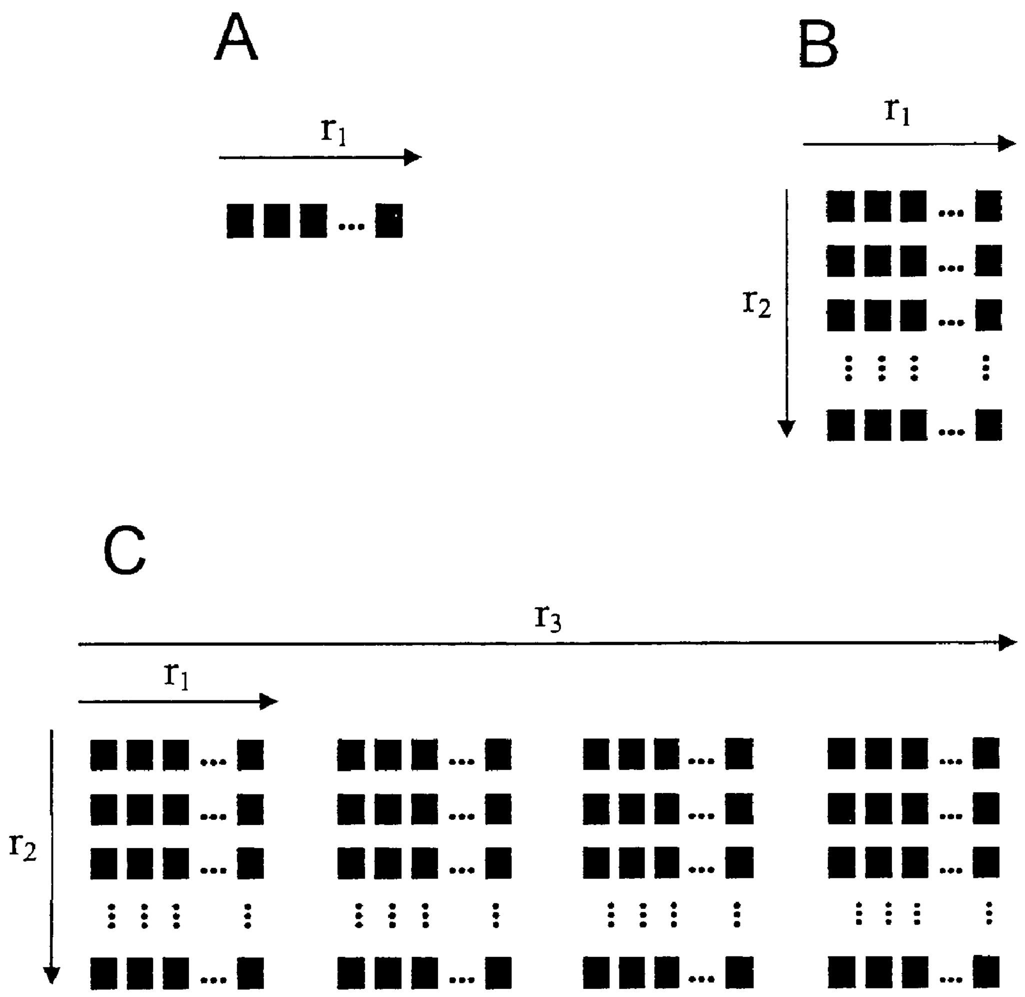
FIG. 4 shows how multidimensional maps are constructed, similar to the process for playing three-dimensional Tic-tac-toe with iterative steps to give the map a fractal nature.
Figure 4:
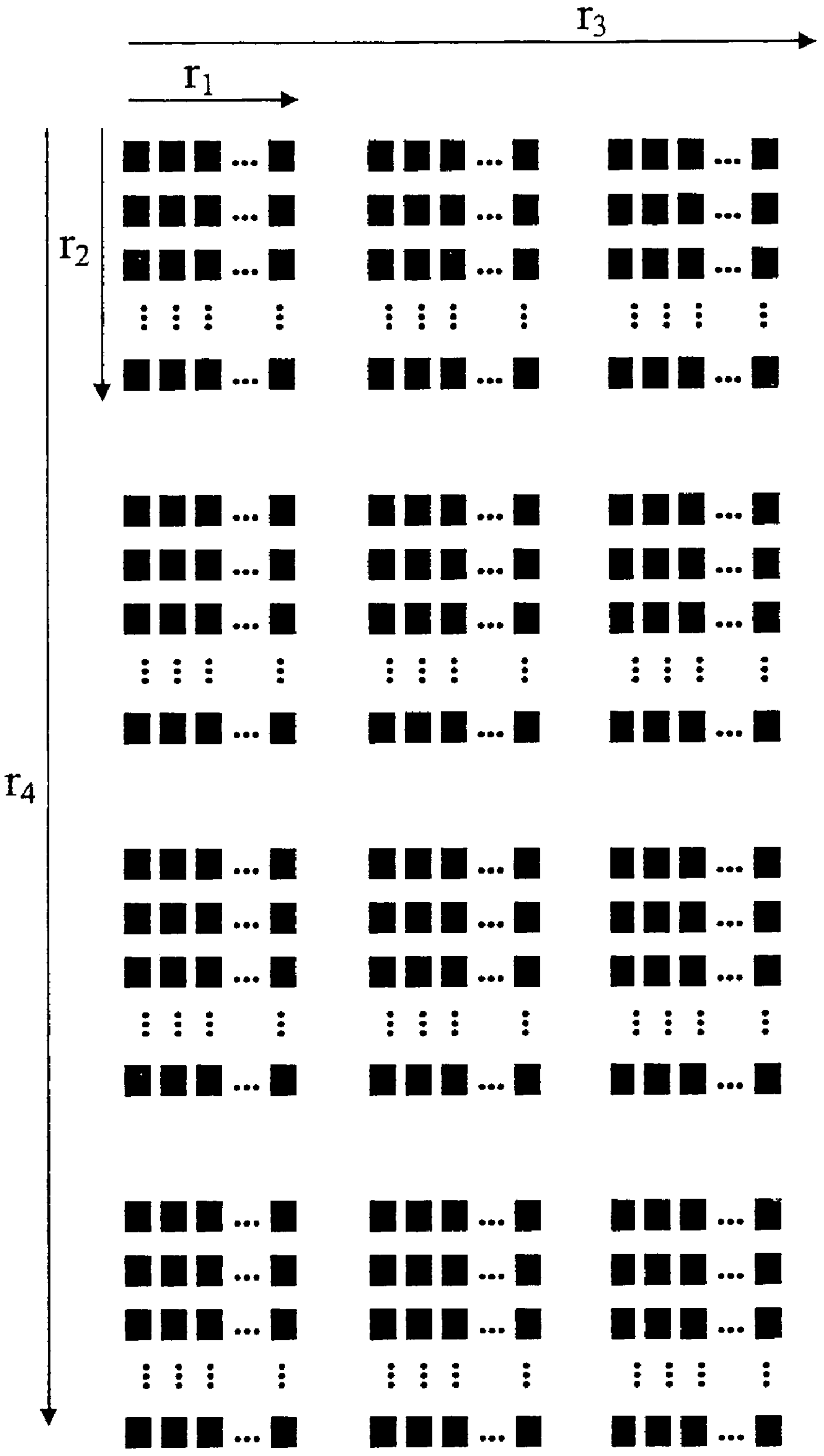

Referring to FIG. 1, the figure shows the general outline of the four essential elements of fractal harmonic overtone mapping and the feedback loops from which its properties emerge. Referring to FIG. 2, the figure shows the tonotopic orientation of the cochlea, and the harmonic overtones for the notes of the 12-division octave eliminating names with sharps and flats, using the notation for the white keys CDEFGAB and the black keys PQ XYZ of the piano keyboard (using the mnemonic "PDQ") with the equivalences P=C#/Db, Q=D#/Eb, X=F#/Gb, Y=G#/Ab, Z=A#/Bb. Referring to FIG. 3, the figure shows harmonic fields in the cochlea, and demonstrates the harmonic fields that correspond to factors 2, 3, 5, 7, and 11. Referring to FIG. 4, the figure shows how multidimensional maps are constructed, similar to the process for playing three-dimensional Tic-tac-toe with iterative steps to give the map a fractal nature. Referring to FIG. 5, the figure shows a 3-dimensional fractal map, simplified to illustrate a musical scale with two dimensions (a "diatonic scale").

Figure 7:
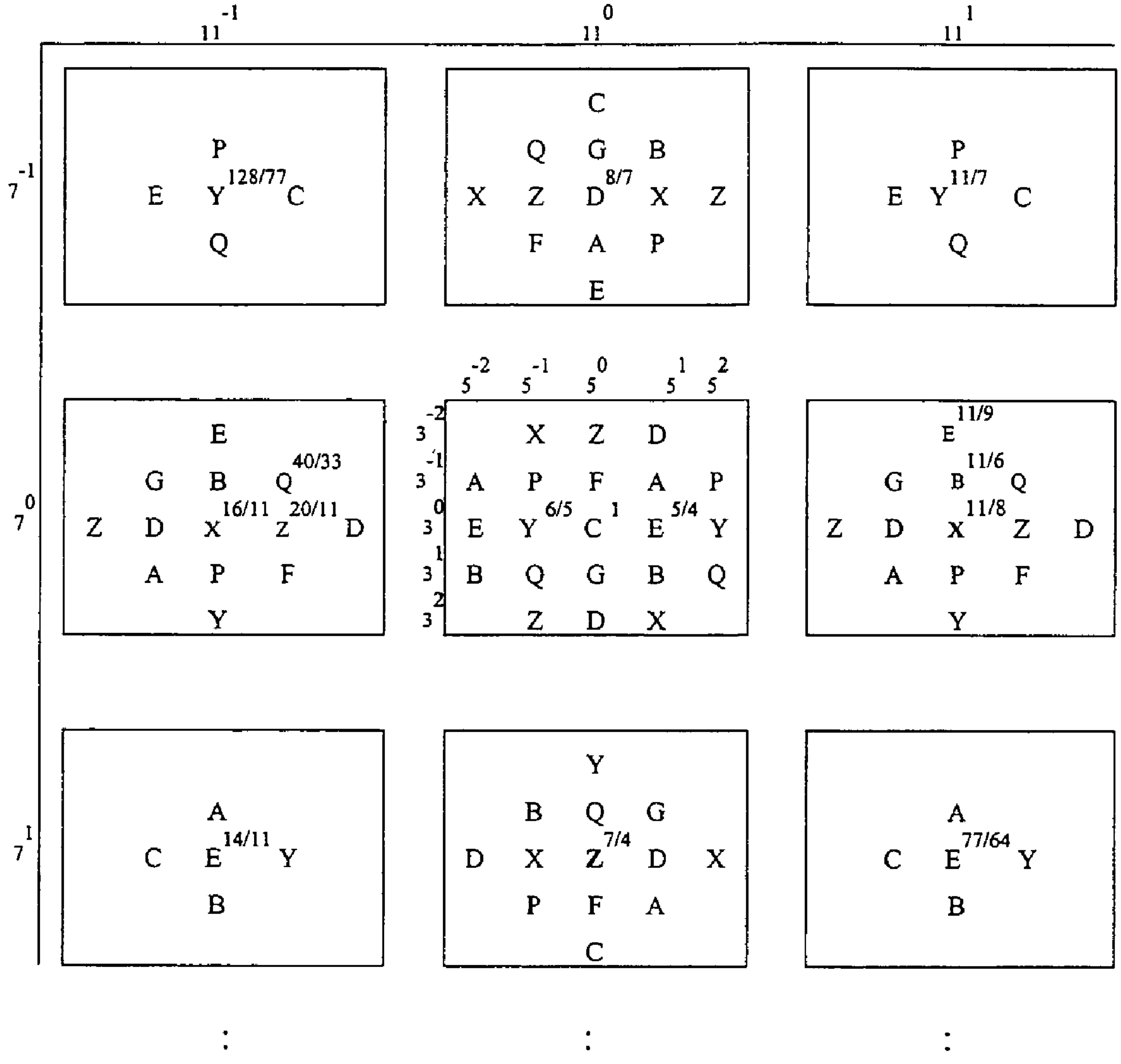
FIG. 7 shows another aeneral pattern of fractal mapping of harmonic overtone space.

Referring to FIGS. 6 and 7, the figures show the general pattern of fractal mapping of harmonic overtone space. Maps are centered around C1. In FIG. 6, the basic "A to Z" pattern of 12 rows and 3 columns (12 rows for the dimension $3^K$, and 3 columns for the dimension $5^L$) gives a 12×3 array that tessellates over the fractal map. The letter pattern can be extended indefinitely over the map of harmonic overtones in the array defined by the 3K and 5L dimensions based on the factors 3 and 5. The first drawing is the two-dimensional "k by l" array "from A to Z" that shows how each point in an array can be associated with an exact ratio musical note (indicated with an approximate letter tone, each of which is unique). C in the second row, third column corresponds to a value of 80/81; the C indicated by the copyright symbol has a value of 1/1; the C near the bottom has a value of 81/80 (fractal maps are consistent with regard to translational movements; a chess-like move such as "down four, back one" always changes the formula by the same factor for a given plane). FIG. 7 shows a 3×3 pattern centered around $C^1$ that uses the $7^M$ and $11^N$ dimensions based on factors 7 and 11. A complete letter pattern that tessellates over the plane for the $7^M$ and $11^N$ dimensions would have a repeating 6 row pattern of arrays (with central letters D, C, Z, Y, X, E) for factor 7, and a repeating 2 column pattern of arrays for factor 11, thus requiring a 6×2 pattern. The illustration shows only a 3×3 pattern centered around C1 that illustrates neighbor relations along the dimensions $^{7M}$ and $11^N$. The drawing shows a four-dimensional k by l by m by n array. When the bold-face X, with value $X^{11/18}$, is detected, an adaptive feedback signal is sent out to enhance spectral signals that may be detected at $C^1$ (copyright symbol) and suppress signals at other sites (corresponding to other C's that are farther away). When boldface $Z(Z^{7/4})$ is detected, the same adaptive feedback process occurs.

Figure 8:
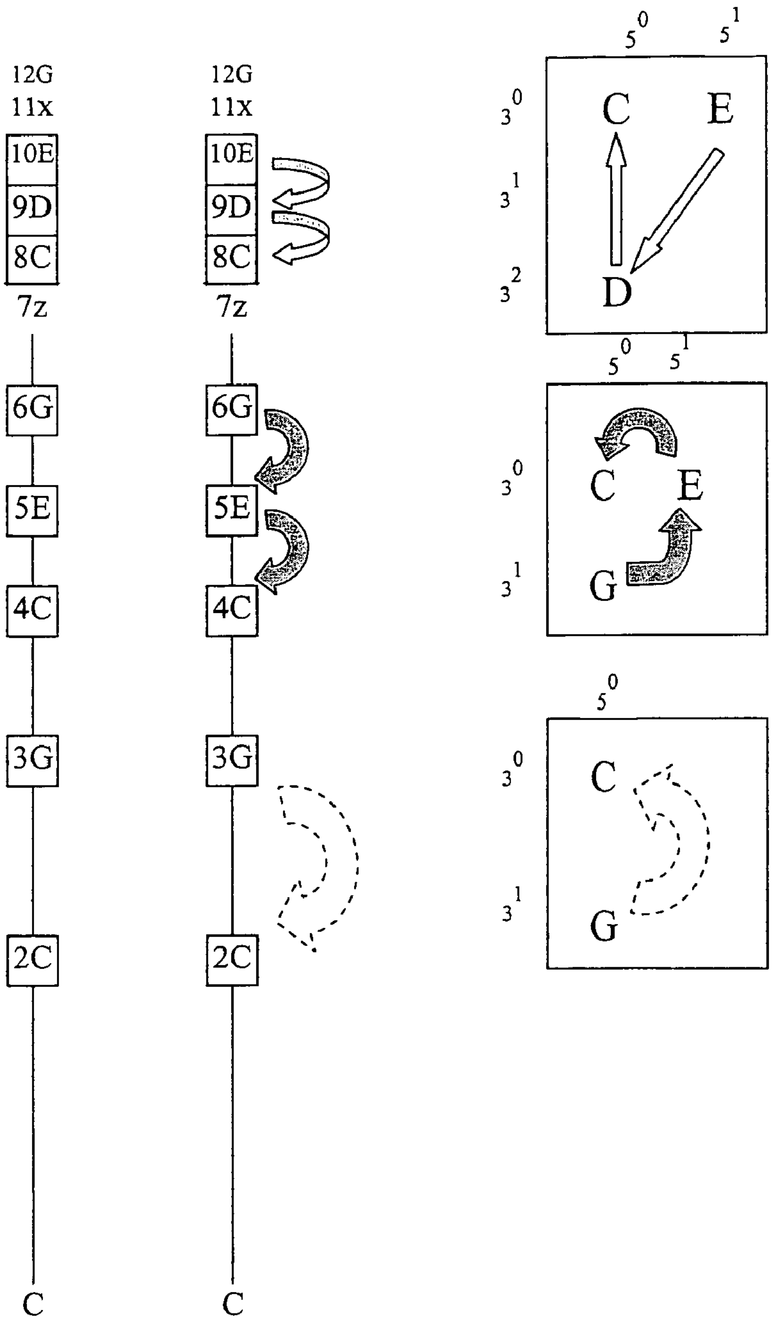
FIG. 8 shows how information from harmonic overtones can be visualized as movement on the fractal landscape of harmonic space.
Figure 9:
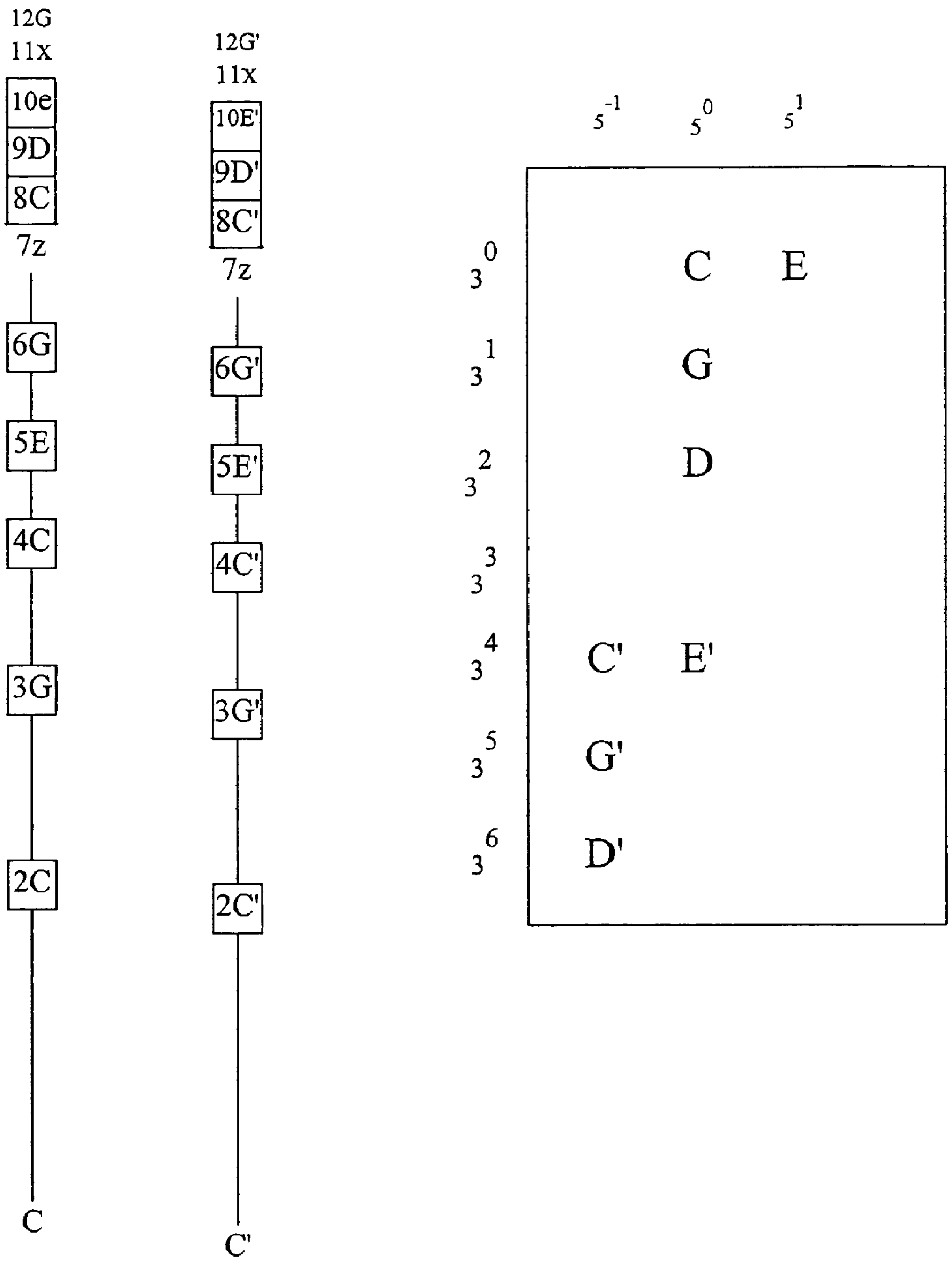
FIG. 9 shows that frequency discrimination can easily separate tones that are a "diatonic comma" apart (an 81/80 ratio)
Figure 10:
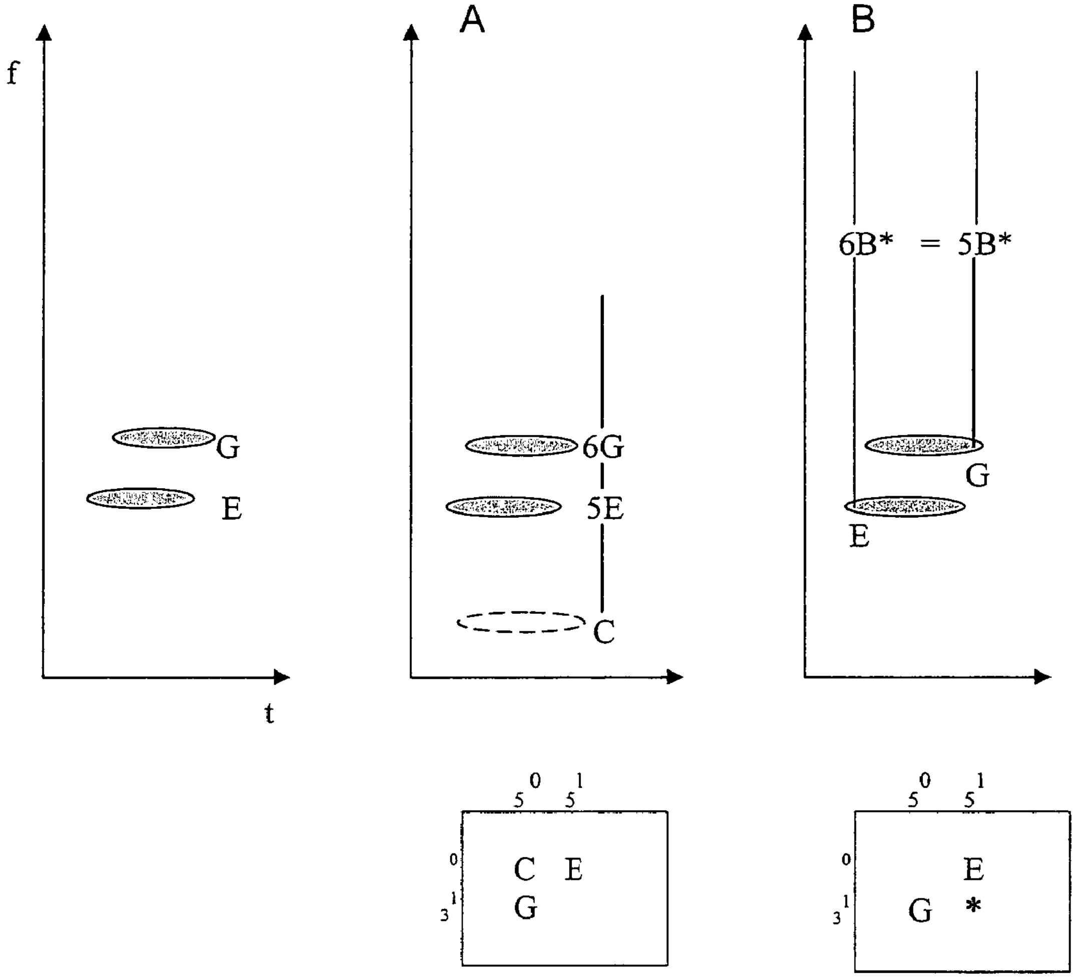
FIG. 10 shows how the relationship between vowel formants and other simultaneous tones can be ascertained by two distinct mechanisms.
Figure 11:
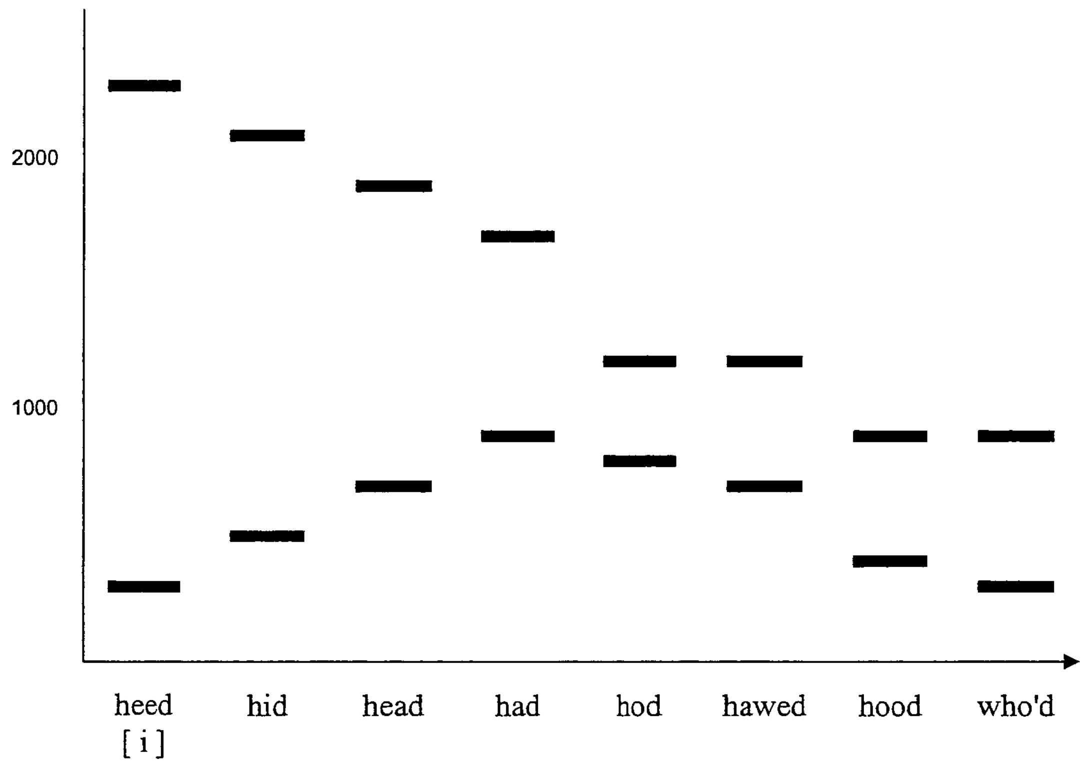
FIG. 11 shows examples of vowel formants, redrawn from Peter Ladefoged Elements of Accoustic Phonetics, Univ Chicago Press (1996)
Figure 12:
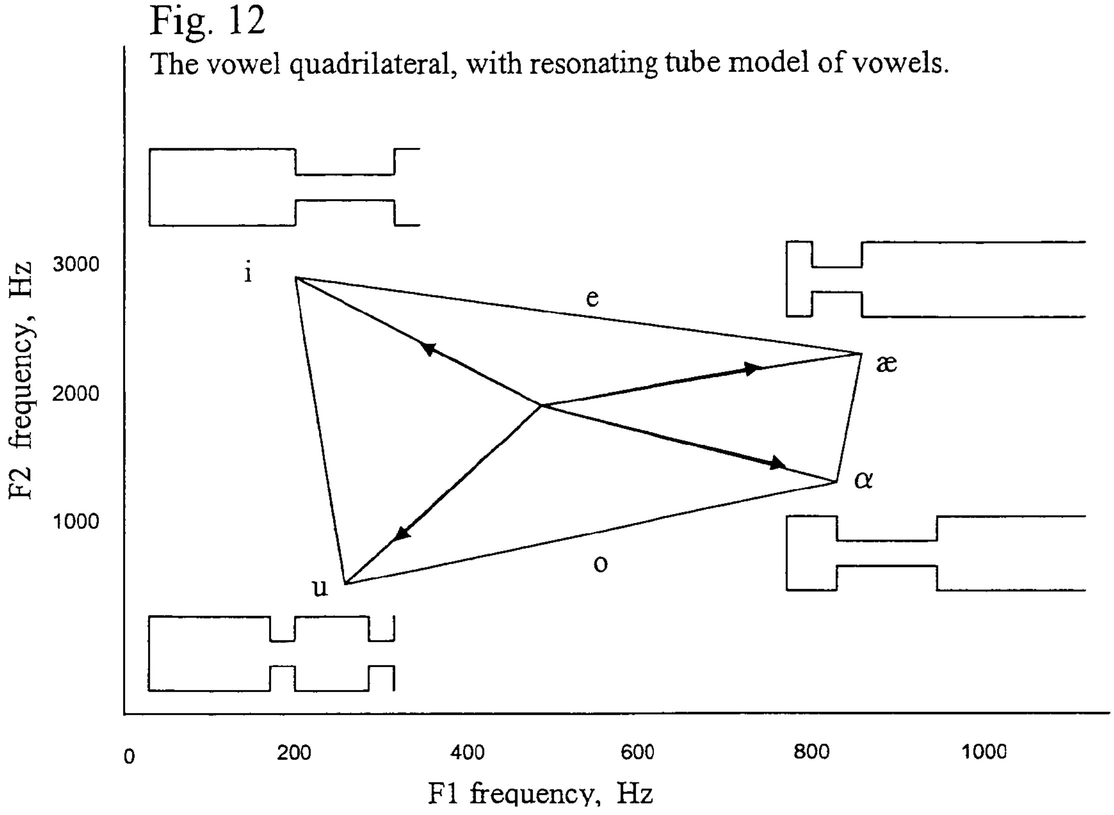
FIG. 12 shows F2 vs. F1 plots of the basic parameters of the major vowels of English, including the vowel quadrilateral and resonating tube models.
Figure 13:
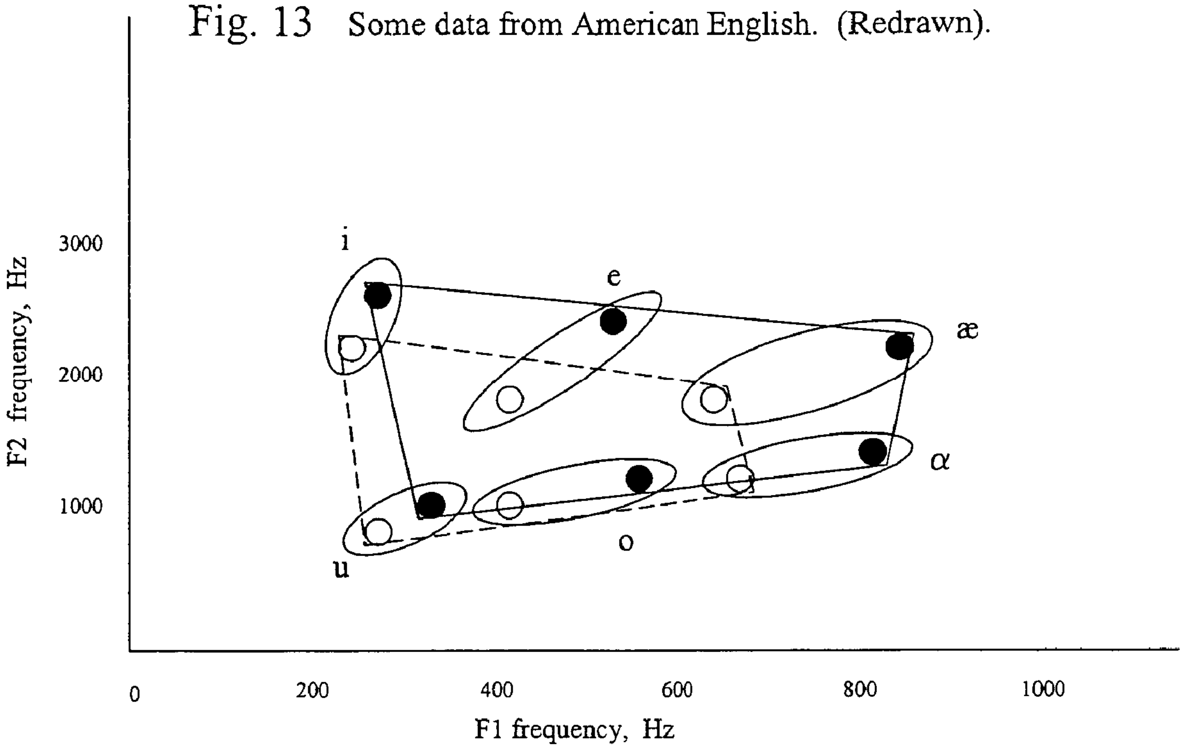
FIG. 13 is redrawn from Stevens to eliminate a semilogarithmic scale, and shows the average values for F1 and F2 formant frequency for vowels of American English for men and women (indicated by separate vowel quadrilaterals)
Figure 14:
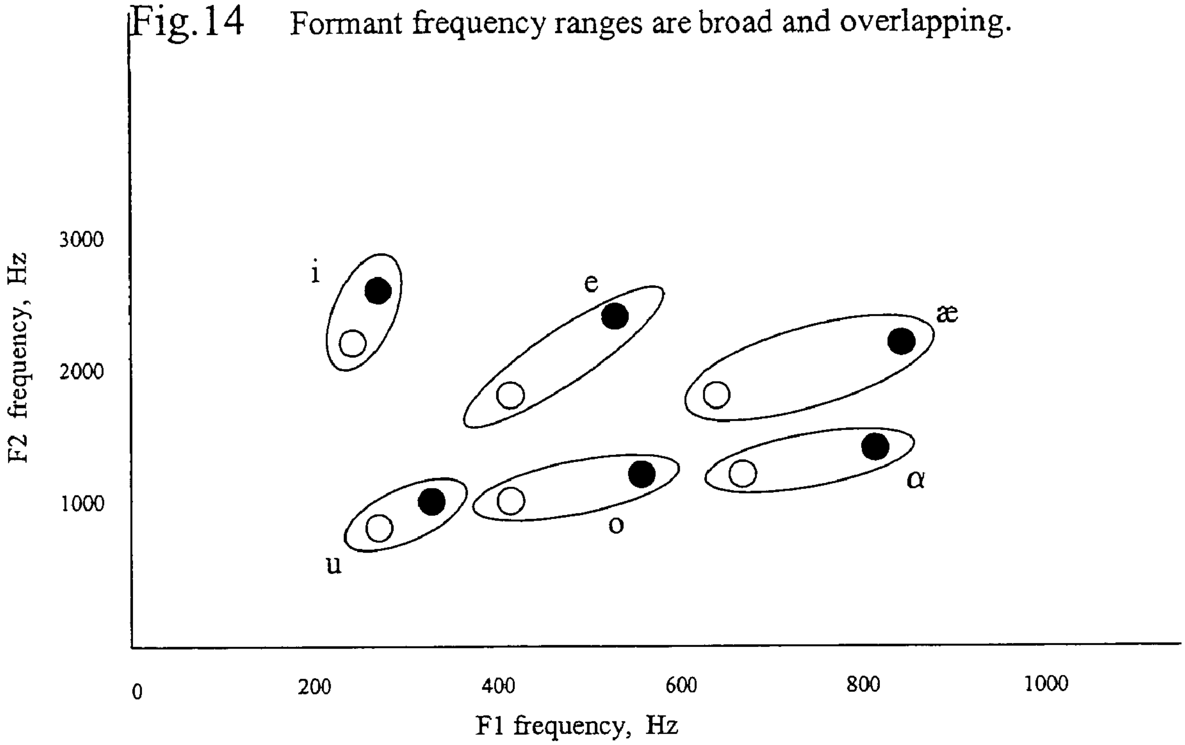
FIG. 14 shows the F2 vs. F1 plot of vowel islands, showing their narrow shape stretching from lower pitch men's voices to higher pitch women's voices.
Figure 15:
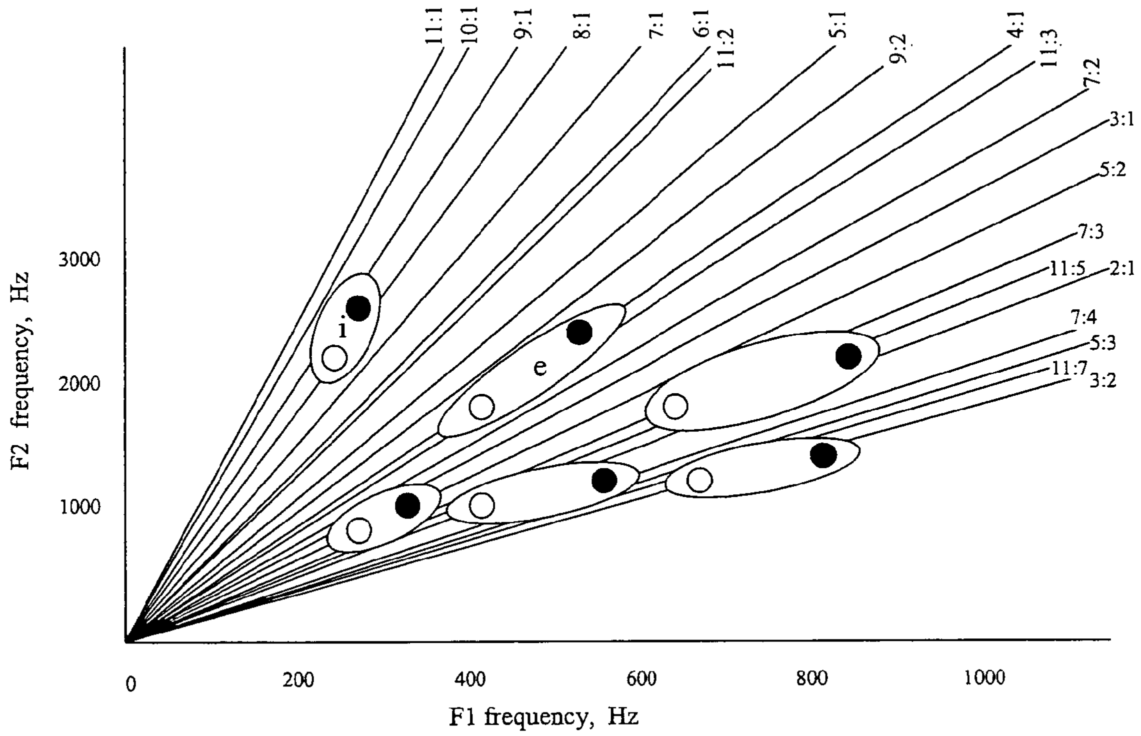
FIG. 15 shows on an F2 vs. F1 plot how the invention provides a better way of defining vowels, based on the simple ratios derived from fractal harmonic overtone mapping of overtones up to harmonic 12.

Referring to FIG. 8, the figure shows how information from harmonic overtones can be visualized as movement on the fractal landscape of harmonic space. Information from higher harmonics can be visualized as an alerting movement, information from middle harmonics as an identifying movement, and information from lower harmonics as a confirmatory movement. Referring to FIG. 9, the figure shows that frequency discrimination can easily separate tones that are a "diatonic comma" apart (an 81/80 ratio). Referring to FIG. 10, the figure shows how the relationship between vowel formants and other simultaneous tones can be ascertained by two distinct mechanisms. The mechanisms are shown to be complementary on the fractal map. Referring to FIG. 11, the figure shows examples of vowel formants, redrawn from Peter Ladefoged, Elements of Acoustic Phonetics, Univ Chicago Press (1996). Referring to FIG. 12, the figures hows F2 vs. F1 plots of the basic parameters of the major vowels of English, including the vowel quadrilateral and resonating tube models. Redrawn from Kenneth N. Stevens, Acoustic Phonetics, MIT Press, Cambridge, Mass. (1998). Referring to FIG. 13, the figure is redrawn from Stevens to eliminate a semi-logarithmic scale, and shows the average values for F1 and F2 formant frequency for vowels of American English for men and women (indicated by separate vowel quadrilaterals);

Referring to FIG. 14, the figure shows the F2 vs. F1 plot of vowel islands, showing their narrow shape stretching from lower pitch men's voices to higher pitch women's voices. For each formant of each vowel, there is a broad overlap with the range of frequencies of the formant of at least one other vowel, showing that vowels have no simple one-to-one relationship to formant frequencies. Referring to FIG. 15, the figure shows on an F2 vs. F1 plot how the invention provides a better way of defining vowels, based on the simple ratios derived from fractal harmonic overtone mapping of overtones up to harmonic 12. The lines of slope easily characterize vowel islands by going through them to show central tendencies or by passing them tangentially to delimit boundaries. Proceeding in a clockwise direction across the top, all ratios from 11:1 to 7:2 are shown. Moving down the right side, selected ratios are shown that apply to the vowel islands of American English. Below the line labeled 3:2 would be musical ratios 4:3, 5:4, 6:5, 7:6, 8:7, 9:8, 10:9, and 11:10. Similar graphs for F2/F1 in other languages show that the vowel islands may have different central tendencies and boundary values. However, the ratios appear to be used as parameters in a similar fashion.

Figure 16:
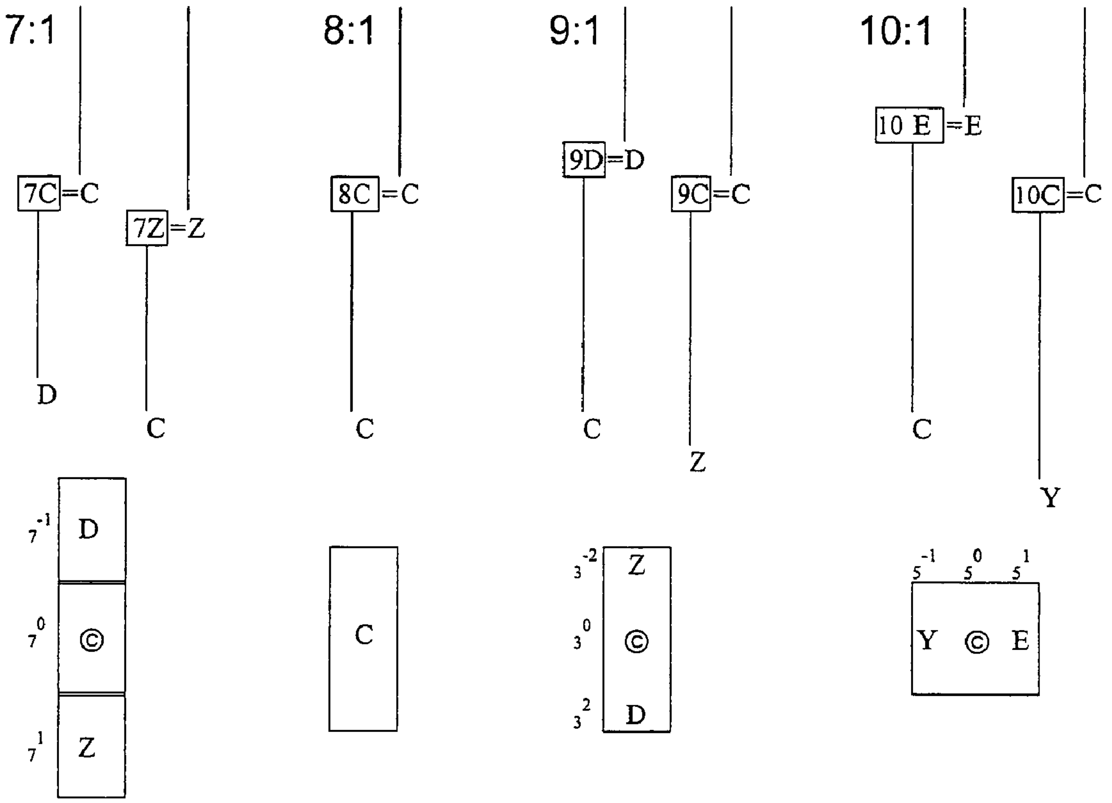
FIG. 16 shows how points on the fractal map are used to specify the vowel [i]
Figure 17:
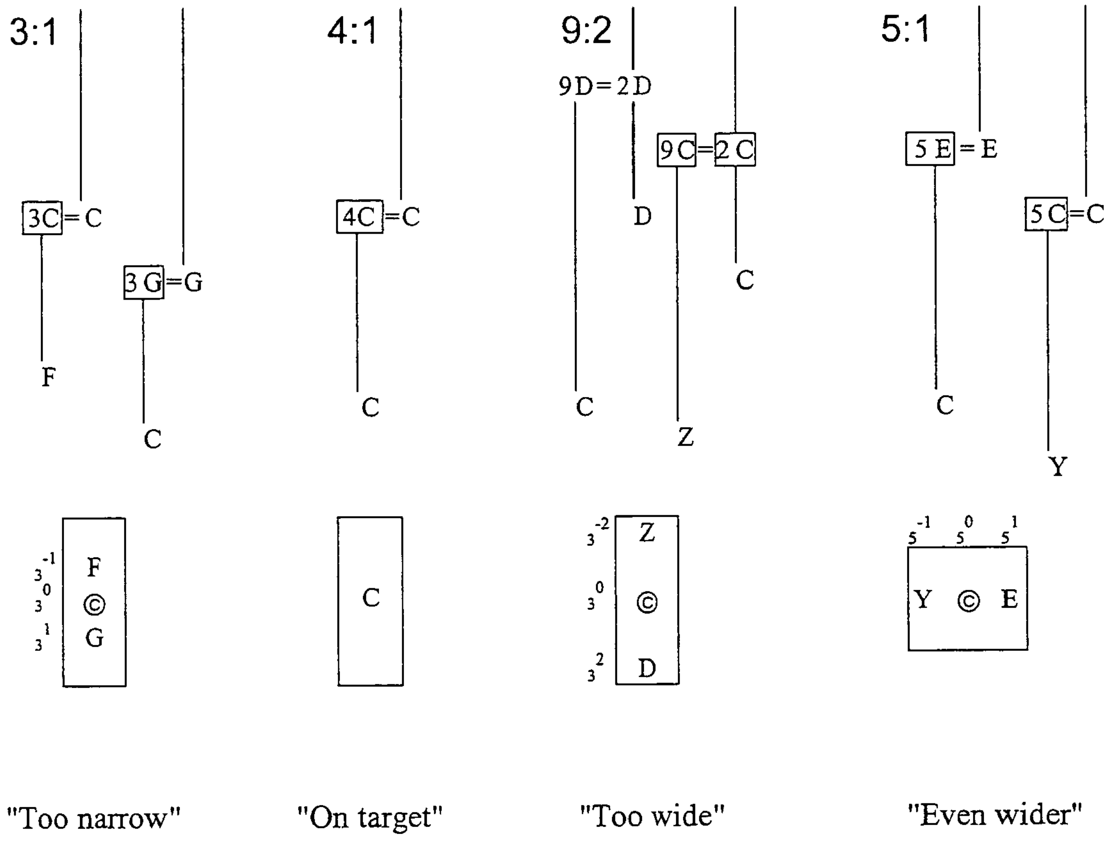
FIG. 17 shows how points on the fractal landscape are used to specify [e]
Figure 19:
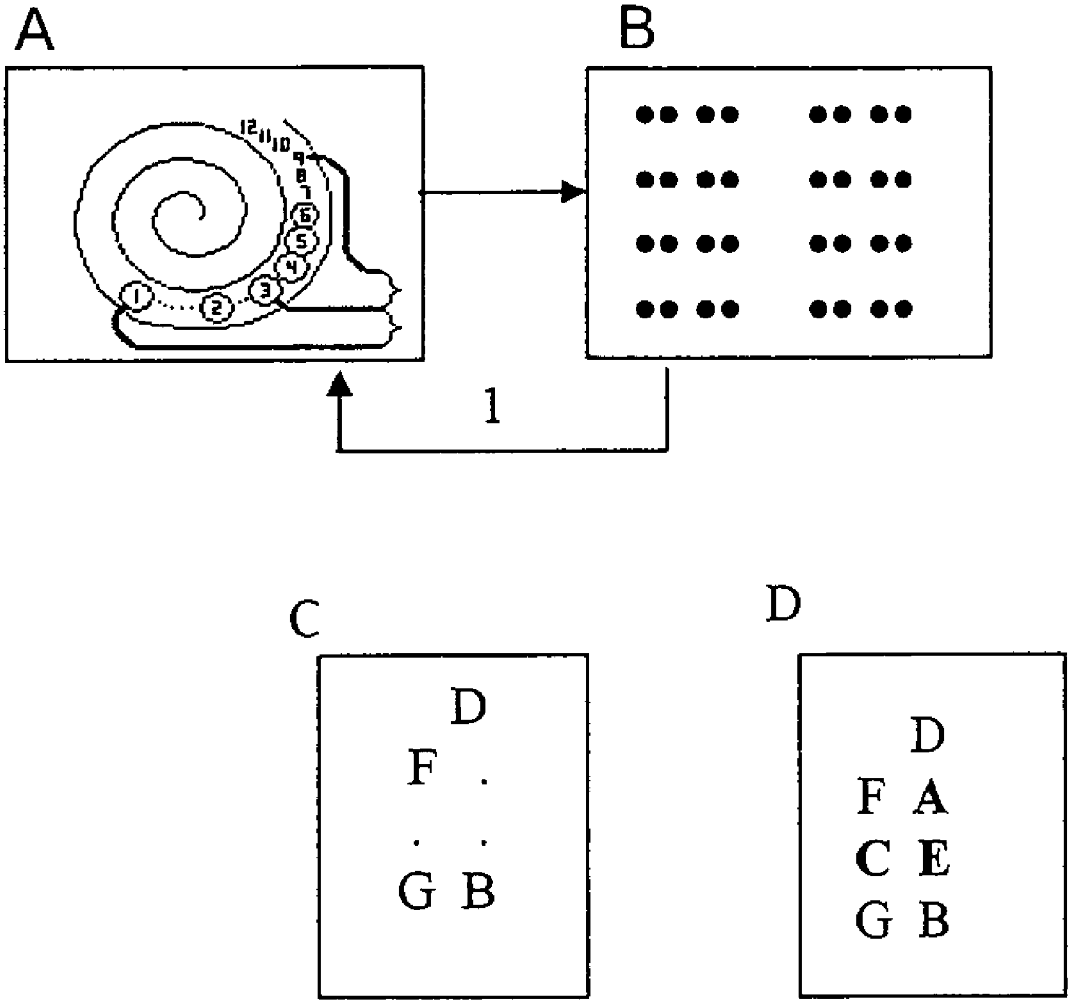
FIG. 19 reviews the basic feedback mechanism of high resolution adjustment of input sensitivity (Process 1)
Figure 20:
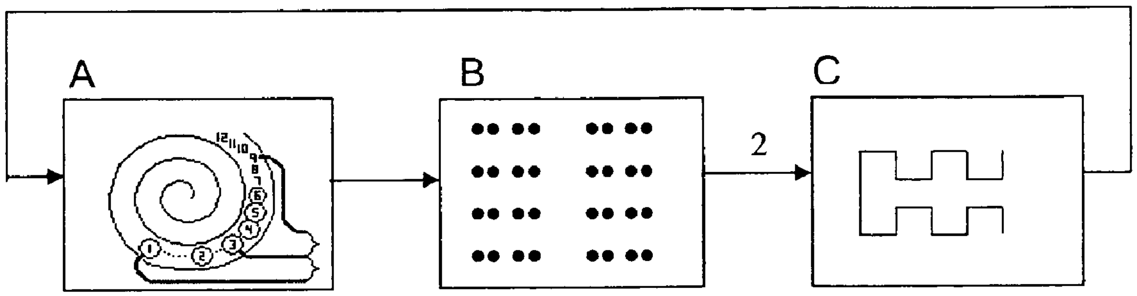
FIG. 20 reviews the basic feedback mechanism of adaptive control of output acoustics and phonology (Process 2)

Referring to FIG. 16, the figure shows how points on the fractal map are used to specify the vowel [i]. Referring to FIG. 17, the figure shows how points on the fractal landscape are used to specify [e]. Not illustrated because of space limitation are the ratios 11:3 (on target) and 7:2 (too narrow). Referring to FIG. 18, the figure shows how the uniform output of consonant-vowel coarticulation can be explained by movement patterns on the fractal landscape without invoking hypothetical "loci" for consonants. Referring to FIG. 19, the figure reviews the basic feedback mechanism of high resolution adjustment of input sensitivity (Process 1). As an example, a partially characterized fractal map (C) may lead to feedback that increases gain for a specific part of the fractal map that would be a consistent fit. Alternatively, there could be inhibition of input from harmonic fields that are inconsistent with an expected pattern. Referring to FIG. 20, the figure reviews the basic feedback mechanism of adaptive control of output acoustics and phonology (Process 2). As an example, the fractal map could directly control sound output from a resonating tube with a constriction. For a typical sound like fricative, aerodynamic forces make it easier to adjust a constrictor to maximize the (turbulent) noise. Sound as input could be monitored via the fractal map, and any harmonic overtones that are detected could be used as an indication of direction and magnitude by which to change the constrictor. In general, adjustments could be made automatically in background noise or other specific auditory conditions.

Figure 21:
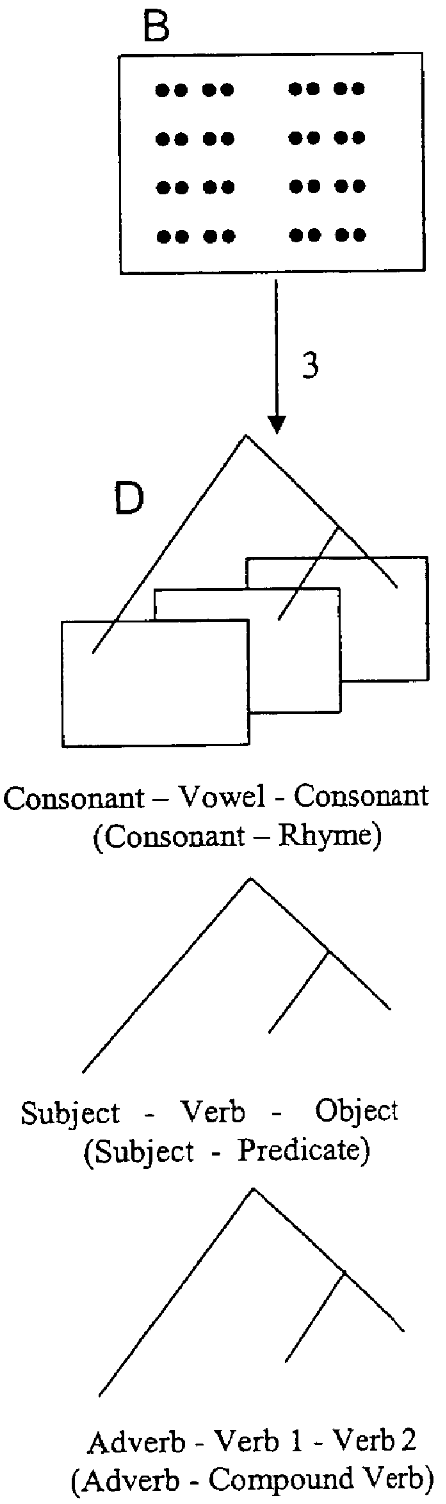
FIG. 21 shows how the fractal map could be used for information storage and pattern recognition.
Figure 22:
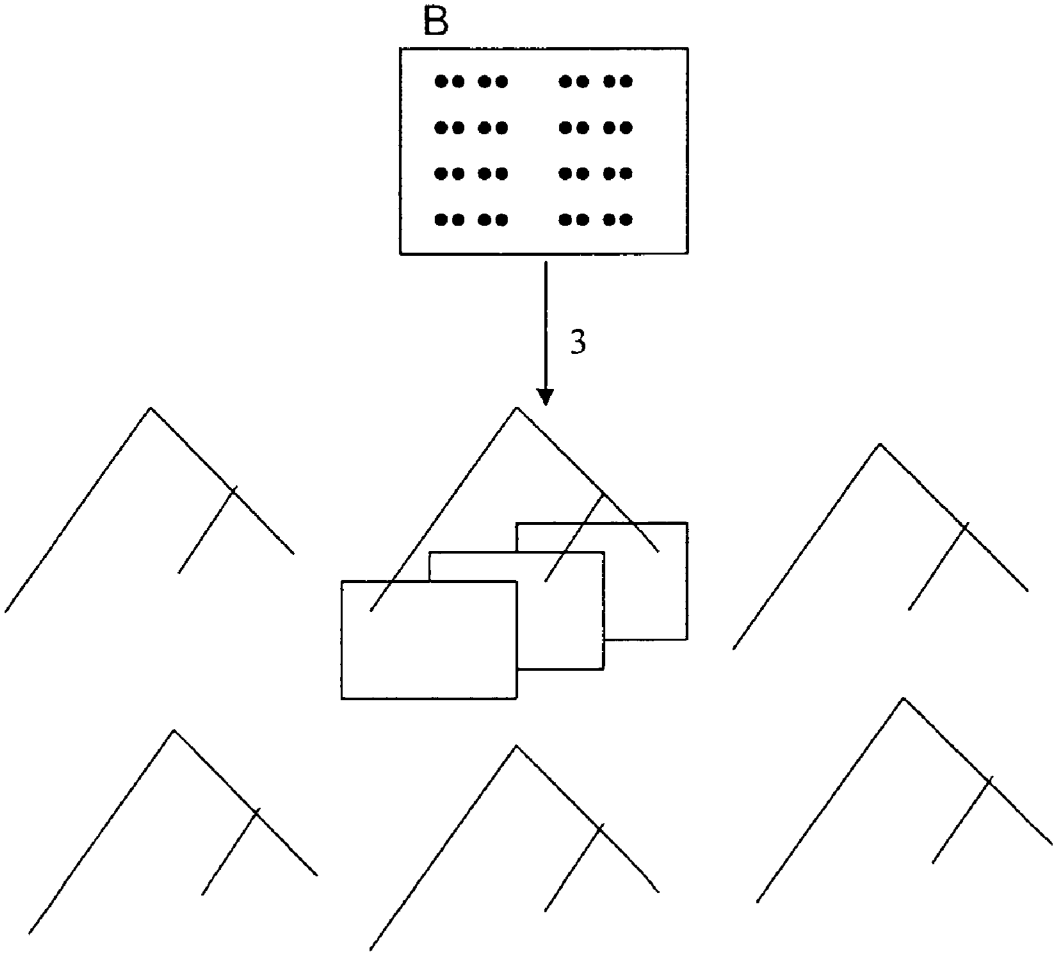
FIG. 22 shows how the same information storage and pattern recognition architecture could allow switching from one language-specific set of rules to another.

Referring to FIG. 21, the figure shows how the fractal map could be used for information storage and pattern recognition. A multitude of consecutive fractal maps (indicated by a stack of forms) over a period of time could be analyzed for patterns (indicated by branching lines). The minimal nature of the fractal map would allow specific characteristic features in a sequence of fractal map data to be the working model or template that defines a word, sentence, or grammatical feature. Words and syllables could follow a consonant-vowel-consonant (CVC) pattern. Sentences or phrases could follow a subject-verb-object (SVO) pattern. Compound verbs and other grammatical feature could follow a "Verb 1, Verb 2" (V1V2) pattern. Referring to FIG. 22 the figure shows how the same information storage and pattern recognition architecture could allow switching from one language-specific set of rules to another. The same process that allows this would potentially exhibit dynamical system behavior with possible chaotic behavior organized around "attractors." For example, input could be identified as the word "we," and adjustments for formants, words, and grammar patterns could be initiated, until input was re-identified as the French word "oui.". Referring to FIG. 23, the figure shows plausible frequencies obtainable from a 4620 Hz signal by simple counting circuits. Counting circuits are of the "one-two-three one-two-three" type. Combinations of counting circuits using the ratios 2:1, 3:1, 5:1, 7:1 and 11:1 can lead to a variety of frequencies, here calculated down to frequencies of about 40 Hz. (4620 Hz was chosen for ease of calculation; numbers in boldface are exact frequencies, in Hertz) The various subharmonics tend to fill only the lower right corner of the fractal map. Referring to FIG. 24, the figure shows inputs from segments that are neighbors in the cochlear model (arrows) can be mapped to widely spaced points on a fractal map. This may result in uneven coverage. Each input is shown with its associated subharmonics. These subharmonics may overlap in various areas in the fashion of overlapping tiles (the lines and dots, representing subharmonics filling a corner of a fractal map like FIG. 23). Dotted lines illustrate that a portion of a fractal lattice can be chosen so that an area (between the dotted lines) closely resembles a similar area (immediately above one dotted line or immediately below the other dotted line), offset by a constant factor. Specifying the degree of similarity that will be tolerated allows us to define the size of a typical region that mirrors the map as a whole. The fractal map "rolls over" and repeats itself regularly across an extended fractal lattice.

A method and apparatus for fractal harmonic overtone mapping of speech and musical sounds is described above. Various details of the invention may be changed without departing from its scope. Furthermore, the foregoing description of the preferred embodiment of the invention and the best mode for practicing the invention are provided for the purpose of illustration only and not for the purpose of limitation—the invention being defined by the claims.

I claim:

1. An apparatus for signal processing based on an algorithm for representing harmonics in a fractal lattice, the apparatus comprising:

(a) a plurality of tuned segments, each tuned segment including a transceiver having an intrinsic resonant frequency, the amplitude of the resonant frequency capable of being modified by at least one of the group of steps consisting of receiving an external input signal, and internally generating a response to an applied feedback signal;

(b) a plurality of signal processing elements arranged in an array pattern, the signal processing elements including at least one function selected from the group consisting of buffer means for storing information, feedback means for generating a feedback signal, controller means for controlling an output signal, connection means for connecting the plurality of tuned segments to signal processing elements, and feedback connection means for conveying signals from the plurality of signal processing elements in the array to the tuned segments; and wherein individual ones of the signal processing elements include a neural-column structure having a plurality of layers, at least some of which layers are capable of functioning as counting circuits.

2. The apparatus according to claim 1 wherein the tuned segments are arranged consecutively in a cochlea-like pattern and together form an active cochlear model device.

3. The apparatus according to claim 1, wherein the counting circuits are selected from the group consisting of 2:1 counters, 3:1 counters, 5:1 counters, 7:1 counters, and 11:1 counters.

4. The apparatus according to claim 1, wherein the plurality of signal processing elements are arranged so that an output from the counting circuits can be directed to a counting circuit in another signal processing element in order to generate a plurality of signals at subharmonic frequencies, each subharmonic frequency being associated with a separate signal processing element.

5. The apparatus according to claim 1, wherein the algorithm comprises the steps of:

(a) creating a rectangular array, with position along the row indicating magnitude in the first dimension and position in the column indicating magnitude along a second dimension;

(b) making a plurality of copies of the array and displacing them horizontally for the next dimension, the plurality of arrays indicating the various magnitudes;

(c) making a plurality of copies of all the previous arrays and displacing them vertically, the plurality of arrays corresponding to various magnitudes in the next dimension, and the totality in effect being a larger array;

(d) repeating step (b) and then step (c) alternately for subsequent dimensions; and (e) associating a value R with each point on a fractal lattice according to a formula having a factor for each dimension, with each factor having an integer exponent for each magnitude, the formulae following the prototype: associating a value R with each point j,k,l,m,n) on the fractal lattice, according to the formula for five dimensions:

#EQ1#R=2.sup.j*3.sup.k*5.sup.L*7.sup.m*11.sup.n.

where the factors 2, 3, 5, 7, and 11 are dimensions and j, k, l, m, and n are magnitudes.

6. The apparatus according to claim 1, wherein a fractal lattice of a reduced number of dimensions is provided, with mapping based on:

(a) four dimensions corresponding to the factors 3, 5, 7, and 11;

(b) mapping based on three dimensions corresponding to the factors 3, 5, and 7 or the factors 3,5, and 11;

(c) mapping based on the two dimensions corresponding to the factors 3 and 5; and (d) in (a), (b), and (c), associating values to points on the fractal lattice according to a formula with a factor for each dimension, and integer exponents for each magnitude.

7. The apparatus according to claim 1, wherein a fractal lattice with dimensions numbering greater than five is constructed based on factors selected from the group consisting of 13, 17, 19, 23, and higher prime numbers; and a fractal lattice is constructed based on factors that are composite numbers, the mapping associating values with points on the fractal lattice according to a formula with a factor for each dimension, and integer exponents for each magnitude.

8. The apparatus according to claim 1, wherein the signal processing elements include the feedback means for generating the feedback signal and feedback adjustment means for adjusting feedback to tuned segments to provide a subthreshold signal (at the characteristic frequency) that improves sensitivity to amplitudes near a threshold value.

9. The apparatus according to claim 8, wherein feedback signals are fed from a plurality of points forming a pattern on a fractal map that includes harmonically related signals that minimize interference beating due to alternating constructive and destructive interference.

10. The apparatus according to claim 8, wherein feedback signals are from a plurality of points forming a pattern on a fractal map that are sampled rapidly to maintain phase sensitivity and produce a strobing effect in the cochlear model.

11. The apparatus according to claim 8, wherein harmonically related signals of similar phase derived from subharmonic generators are used to reinforce input signals at tuned segments by subthreshold strobing at the characteristic frequency of such segments.

12. The apparatus according to claim 8, wherein feedback signals are fed from a plurality of points on a fractal map having subregions with at least two separate phases simultaneously, each phase directed to distinct segments of the cochlear model, including but not limited to those responding to input signals from different sources.

13. The apparatus according to claim 8, wherein feedback signals from a single point on a fractal map are directed to a plurality of segments that correspond to magnitudes along one of the dimensions of the fractal map, wherein the magnitudes are selected from a multiplexed signal from one signal processing element to multiple segments having characteristic frequencies F, 2F, 4F, 8F, 16F and 32F.

14. The apparatus according to claim 8, wherein feedback signals from a plurality of points forming a pattern that moves sequentially across a fractal map are directed to a plurality of tuned segments to reinforce transient input signals.

15. The apparatus according to claim 1, wherein signal processing elements are combined to function as a rhythm generator for output signals or information storage.

16. The apparatus according to claim 1, wherein an optimal number of tuned segments and signal processing elements are determined by the degree of fine-grainedness and speed of acquisition of the input signal.

17. The apparatus according to claim 1, wherein an optimal number of tuned segments and signal processing elements are determined by the degree of fine-grainedness and speed of a feedback response.

18. The apparatus according to claim 1, wherein an optimal number of dimensions in the fractal lattice and range of values in each dimension is sensitivity and specificity of input and feedback signals of the individual tuned segments of the transceiver.

19. The apparatus according to claim 1, wherein an optimal number of dimensions in the fractal lattice and range of values in each dimension is determined by computational complexity and processing speed.

20. The apparatus according to claim 1, wherein the fractal lattice includes guide means for guiding an organizational pattern for local sections of the array by performing at least one of the processes in a group consisting of:

(a) establishing sensory and feedback connections between the signal processing element for a given frequency and the tuned segment having approximately the same characteristic frequency;

(b) generating a plurality of subharmonic signals that fall within the relevant frequency range of the tuned segments, and tentatively connecting these signal processing elements to the appropriate tuned segments;

(c) selecting unassigned tuned segments and tentatively connecting them to available signal processing elements at dispersed points in the array, approximately matching the intrinsic frequency of each tuned segment with signal processing elements that can create a rhythm generator for another local area of subharmonic frequencies;

(d) maintaining areas of overlapping subharmonics if their interacting counting circuits can be shared and are consistent, and removing the tentative connections if they are inconsistent;

(e) removing any tentative connections from any feedback processing elements in the array if their feedback goes to neighboring tuning segments that are too close together, so that similarly tuned neighboring segments become associated with signal processing elements that are widely spaced; and (f) continuing until signal processing elements are connected to a sufficient number of tuning segments and a sufficient number of subharmonic generators have been organized to cover the array.

21. A method of signal processing based on an algorithm for distributed representation of signals, and of the harmonic relations between components of such signals, represented by a fractal lattice which includes multiple dimensions based on harmonic fields, the method comprising the steps of:

(a) mapping input signals to signal processing elements arranged in an array;

(b) processing signals to generate a plurality of feedback signals at subharmonic frequencies; and (c) combining the plurality of feedback signals with subsequent input signals.

22. The method according to claim 21, and further including the step of providing additional harmonic information in an expanded fractal lattice reflecting a dimension selected from the group consisting of 13, 17, 19, 23, and higher prime numbers.

23. The method according to claim 21, and including the step of simplifying the algorithm by removing one or more factors in order to allow a fractal lattice of a recorded dimension.

24. The method according to claim 21, and including the step of modeling an input signal as a spectral representation selected from the group consisting of a discrete Fourier transform and a logarithmic frequency spectrum.

25. The method according to claim 21, and including the step of deriving the input signal from speech sounds.

26. The method according to claim 21, and including the step of deriving the input signal from the group consisting of musical sounds, a mixture of speech and music, and a mixture of audio signals other than speech, music and a mixture of speech and music.

27. The method according to claim 21, and including the step of deriving the input signal from signals of unknown origin.

28. A computer readable medium having instructions for performing steps according to the method of claim 21.

29. A method for connecting tuned segments to elements in a signal processing array, the method including a step selected from the group consisting of:

(a) establishing initial sensory and feedback connections between a signal processing element for a given frequency and a tuned segment having approximately the same characteristic frequency;

(b) making connections to segments with a frequency lower than a given segment, by generating a plurality of subharmonic signal that fall within the relevant frequency range of the tuned segments, and tentatively connecting at least one signal processing elements to the appropriate tuned segments;

(c) making connections to segments with a frequency higher than a given segment, by using a fractal map with a reduced number of dimensions so that the magnitude along one dimension is not specified;

(d) allowing in effect a multiplexed feedback signal from a point in the fractal map, such as a signal at characteristic frequencies F, 2F, 4F, 8F, 16F and 32F;

(e) selecting unassigned tuned segments and tentatively connecting them to available signal processing elements at dispersed points in the array, thereby approximately matching the intrinsic frequency of each tuned segment;

(f) balancing the processes of connecting signal processing elements to lower frequency segments and the process of connecting signal processing elements to higher frequency segments;

(g) maintaining areas of overlapping subharmonics if their interacting counting circuits can be shared and are consistent, and removing tentative connections if they are inconsistent; and (h) maintaining connections to points in the fractal map of higher frequency if their multiplexed signals are consistent, and removing tentative connections from the points in the fractal map if they are inconsistent.

* * * * *